US007907118B2

(12) United States Patent
Matsui et al.

(10) Patent No.: US 7,907,118 B2
(45) Date of Patent: Mar. 15, 2011

(54) USER INTERFACE APPARATUS, PROGRAM AND RECORDING MEDIUM

(75) Inventors: Gantetsu Matsui, Hyogo (JP); Toshiya Naka, Hyogo (JP); Yoshihiro Kojima, Hyogo (JP)

(73) Assignee: Panasonic Corporation, Osaka (JP)

(*) Notice: Subject to any disclaimer, the term of this patent is extended or adjusted under 35 U.S.C. 154(b) by 948 days.

(21) Appl. No.: 11/587,382

(22) PCT Filed: Apr. 26, 2005

(86) PCT No.: PCT/JP2005/008393
§ 371 (c)(1),
(2), (4) Date: Oct. 24, 2006

(87) PCT Pub. No.: WO2005/109165
PCT Pub. Date: Nov. 17, 2005

(65) Prior Publication Data
US 2007/0220418 A1 Sep. 20, 2007

(30) Foreign Application Priority Data
May 10, 2004 (JP) ................................ 2004-140221

(51) Int. Cl.
*G09G 5/00* (2006.01)
(52) U.S. Cl. ............... 345/156; 340/825.22; 340/825.69; 340/825.72; 348/734; 725/44; 725/47; 725/52
(58) Field of Classification Search .................. 345/156, 345/168, 172, 171; 348/113, 114; 715/511
See application file for complete search history.

(56) References Cited

U.S. PATENT DOCUMENTS
6,445,306 B1 * 9/2002 Trovato et al. ........... 340/825.24
(Continued)

FOREIGN PATENT DOCUMENTS
DE 197 43 283 C1 9/1997
(Continued)

OTHER PUBLICATIONS

"Panasonic Adds Two New DVD Recorders with HDD to DIGA Lineup", DMR-E100, DMR-E200H 28KB, http://panasonic.co.jp/corp/news/official.data/data.dir/en030714-2/en030714-2 . . . Oct. 6, 2006.

*Primary Examiner* — Bipin Shalwala
*Assistant Examiner* — Kelly Hegarty

(57) ABSTRACT

Provided is a user interface apparatus with improved operability thereby allowing a desired alternative to be selected from a plurality of alternatives more smoothly than by conventional techniques. When an instruction is received from a user to display a contents selection reception screen, eight contents corresponding to eight ordinal ranks are selected from among managed contents at intervals of n/8, and are set as selectable alternatives, and a table is created in which the ordinal ranks of the eight selectable alternatives are corresponded with key codes respectively, where each key code represents a press directed to a corresponding one eight press sensors. Based on the created table, a GUI screen is displayed for receiving selection of one of the ordinal ranks. Upon reception of ordinal-rank selection, a set of alternatives in a predetermined number including an alternative corresponding to the selected ordinal rank are displayed as a list, where the predetermined number of alternatives in the set are consecutive in terms of ordinal ranks. When a user selects a desired alternative from the list by operating members 31, the selection reception processing is ended. The user may also scroll through the alternatives by operating the operation member 31.

15 Claims, 26 Drawing Sheets

U.S. PATENT DOCUMENTS

2003/0085793 A1     5/2003     Inoue et al.
2005/0037814 A1     2/2005     Yasui et al.

FOREIGN PATENT DOCUMENTS

| | | |
|---|---|---|
| DE | 197 52 056 A1 | 11/1997 |
| DE | 197 43 283 | 2/1999 |
| DE | 197 52 056 | 5/1999 |
| EP | 1 394 666 | 3/2004 |
| JP | 02/029863 | 1/1990 |
| JP | 2001-184158 | 7/2001 |
| JP | 2002-117751 | 4/2002 |
| JP | 2003-134211 | 5/2003 |
| WO | 2004/001571 | 12/2003 |

* cited by examiner

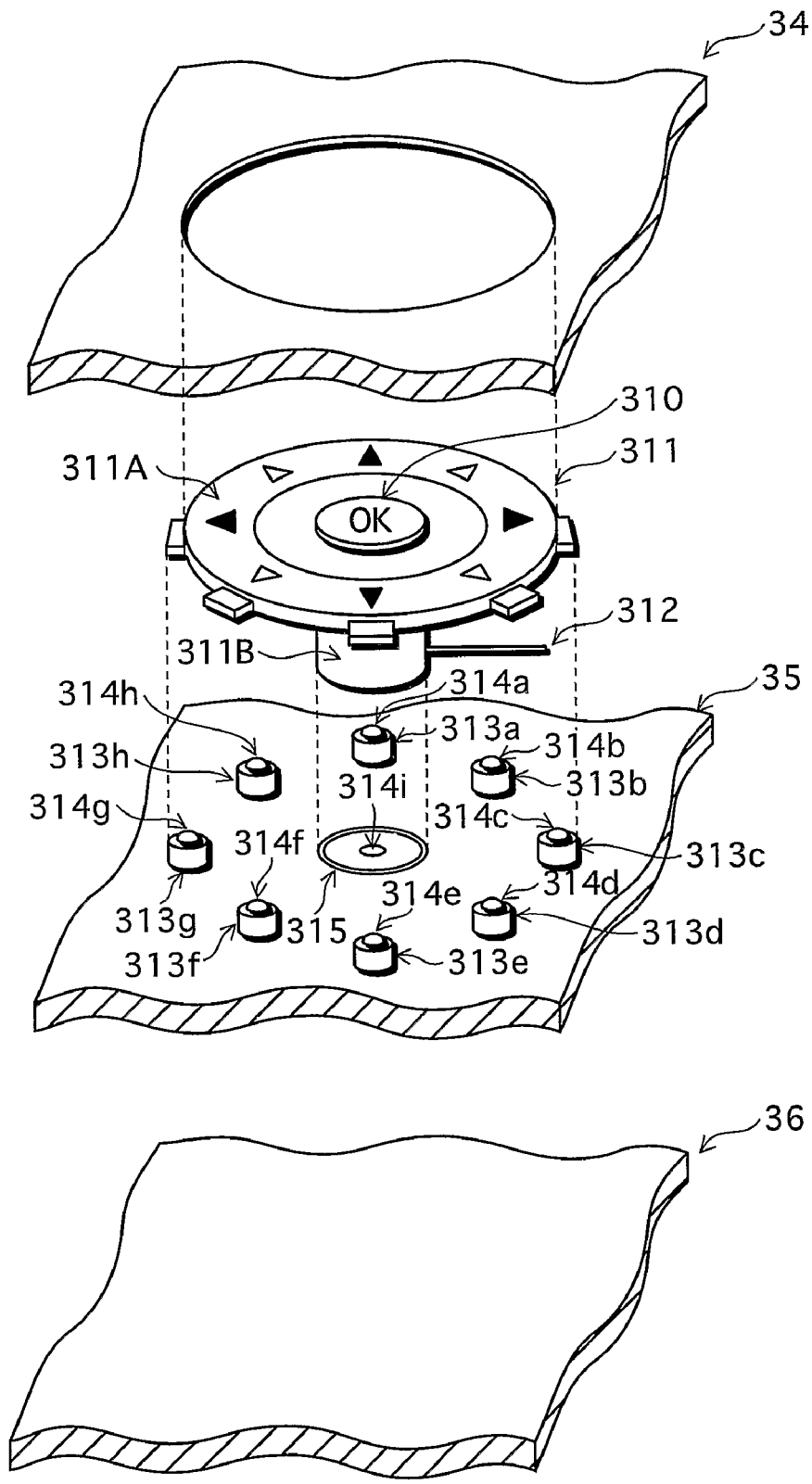

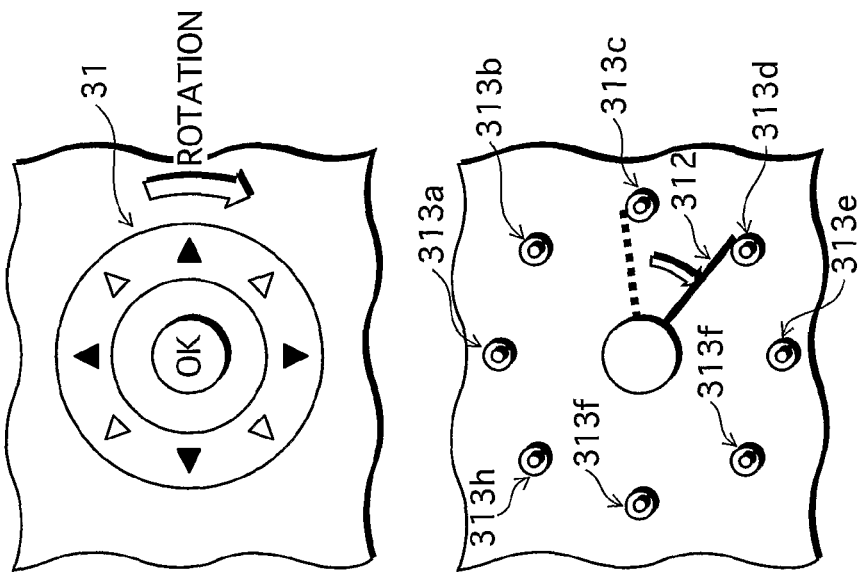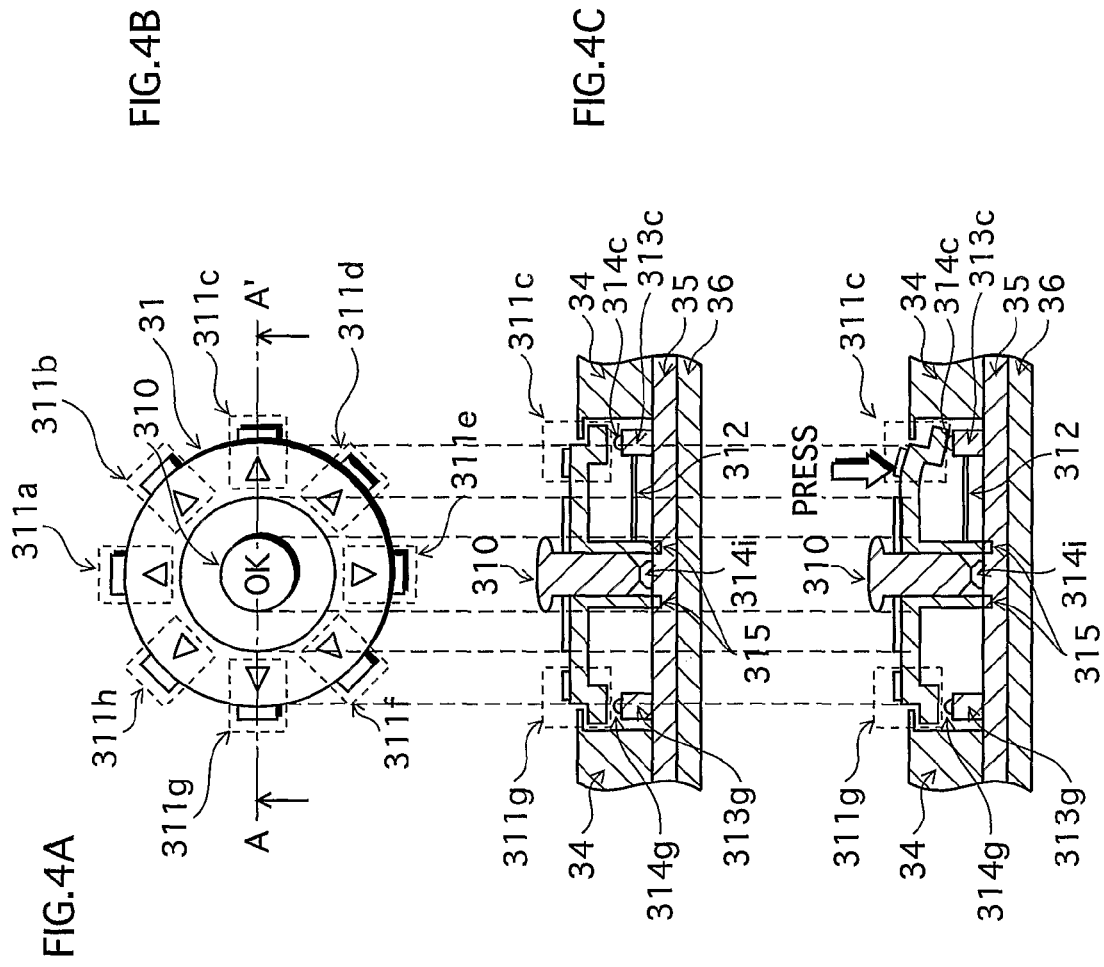

FIG.8

| KEY NAME | KEY CODE | CONTENT'S ORDINAL RANK |
|---|---|---|
| UPPER | 001 | 1 |
| UPPER RIGHT | 002 | 13 |
| RIGHT | 003 | 25 |
| LOWER RIGHT | 004 | 37 |
| LOWER | 005 | 49 |
| LOWER LEFT | 006 | 61 |
| LEFT | 007 | 73 |
| UPPER LEFT | 008 | 85 |

| ROTATION OPERATION | KEY CODE | MOVING AMOUNT OF ALTERNATIVES |
|---|---|---|
| 1 RIGHT ROTATION | 009 | 1 IN LOWER DIRECTION |
| 2 RIGHT ROTATION | 010 | 2 IN LOWER DIRECTION |
| 3 RIGHT ROTATION | 011 | 3 IN LOWER DIRECTION |
| 4 RIGHT ROTATION | 012 | 4 IN LOWER DIRECTION |
| 5 RIGHT ROTATION | 013 | 5 IN LOWER DIRECTION |
| 6 RIGHT ROTATION | 014 | 6 IN LOWER DIRECTION |
| 7 RIGHT ROTATION | 015 | 7 IN LOWER DIRECTION |
| 8 RIGHT ROTATION | 016 | 8 IN LOWER DIRECTION |
| 1 LEFT ROTATION | 017 | 1 IN UPPER DIRECTION |
| 2 LEFT ROTATION | 018 | 2 IN UPPER DIRECTION |
| 3 LEFT ROTATION | 019 | 3 IN UPPER DIRECTION |
| 4 LEFT ROTATION | 020 | 4 IN UPPER DIRECTION |
| 5 LEFT ROTATION | 021 | 5 IN UPPER DIRECTION |
| 6 LEFT ROTATION | 022 | 6 IN UPPER DIRECTION |
| 7 LEFT ROTATION | 023 | 7 IN UPPER DIRECTION |
| 8 LEFT ROTATION | 024 | 8 IN UPPER DIRECTION |

FIG.12

| ROTATION OPERATION | KEY CODE | CONTENTS' ORDINAL RANKS |
|---|---|---|
| 1 RIGHT ROTATION | 009 | 13 |
| 2 RIGHT ROTATION | 010 | 25 |
| 3 RIGHT ROTATION | 011 | 37 |
| 4 RIGHT ROTATION | 012 | 49 |
| 5 RIGHT ROTATION | 013 | 61 |
| 6 RIGHT ROTATION | 014 | 73 |
| 7 RIGHT ROTATION | 015 | 85 |
| 8 RIGHT ROTATION | 016 | 1 |
| 1 LEFT ROTATION | 017 | 85 |
| 2 LEFT ROTATION | 018 | 73 |
| 3 LEFT ROTATION | 019 | 61 |
| 4 LEFT ROTATION | 020 | 49 |
| 5 LEFT ROTATION | 021 | 37 |
| 6 LEFT ROTATION | 022 | 25 |
| 7 LEFT ROTATION | 023 | 13 |
| 8 LEFT ROTATION | 024 | 1 |

1200

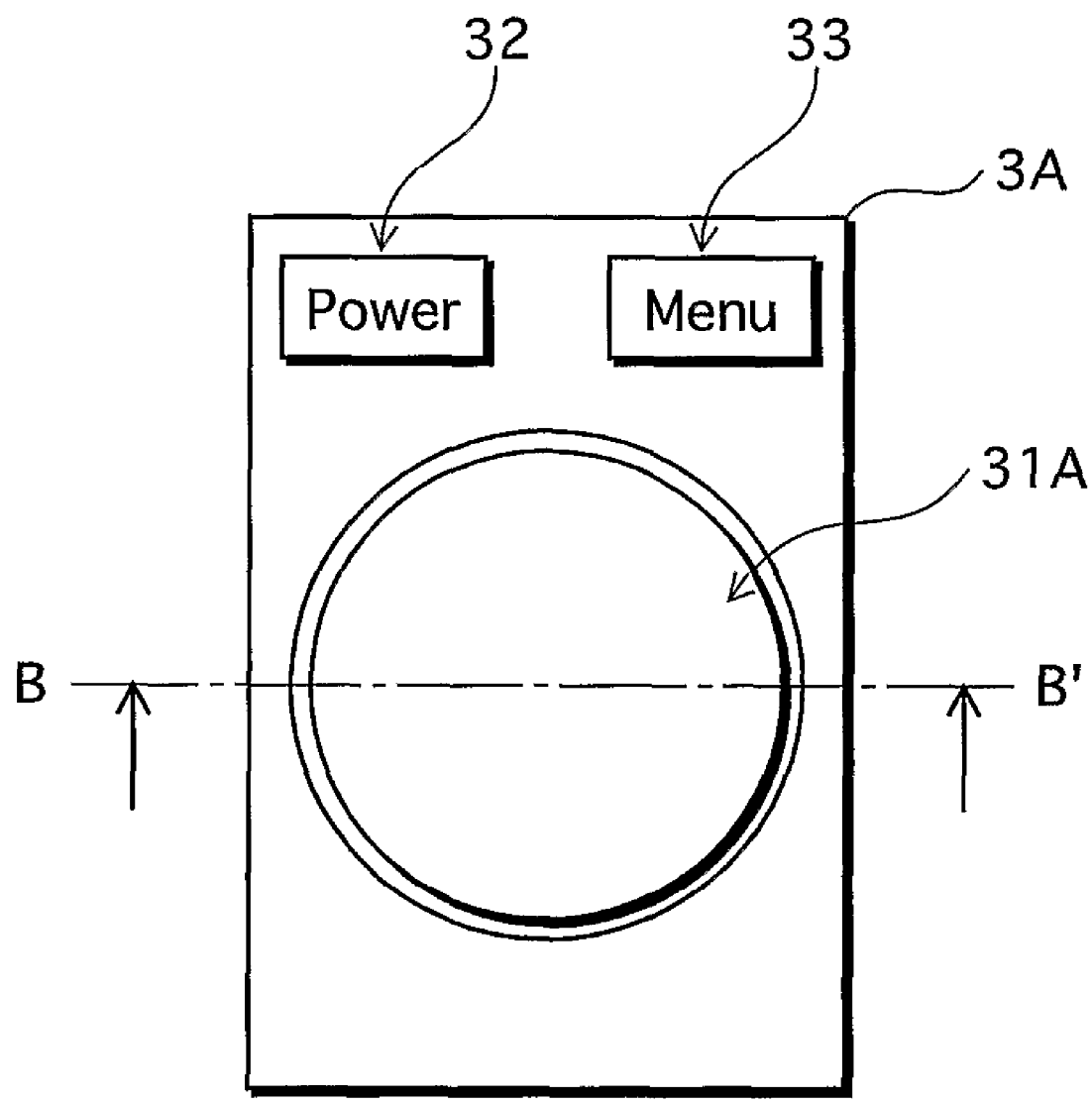

| TOUCH POSITION | KEY CODE | CONTENTS' ORDINAL RANKS |
|---|---|---|
| 0° | 001A | 1 |
| 45° | 002A | 13 |
| 90° | 003A | 25 |
| 135° | 004A | 37 |
| 180° | 005A | 49 |
| 225° | 006A | 61 |
| 270° | 007A | 73 |
| 315° | 008A | 85 |

FIG.19

| FINGER-SLIDE | KEY CODE | MOVING AMOUNT OF ALTERNATIVES |
|---|---|---|
| +45° | 009A | 1 IN LOWER DIRECTION |
| +90° | 010A | 2 IN LOWER DIRECTION |
| +135° | 011A | 3 IN LOWER DIRECTION |
| +180° | 012A | 4 IN LOWER DIRECTION |
| +225° | 013A | 5 IN LOWER DIRECTION |
| +270° | 014A | 6 IN LOWER DIRECTION |
| +315° | 015A | 7 IN LOWER DIRECTION |
| +360° | 016A | 8 IN LOWER DIRECTION |
| −45° | 017A | 1 IN UPPER DIRECTION |
| −90° | 018A | 2 IN UPPER DIRECTION |
| −135° | 019A | 3 IN UPPER DIRECTION |
| −180° | 020A | 4 IN UPPER DIRECTION |
| −225° | 021A | 5 IN UPPER DIRECTION |
| −270° | 022A | 6 IN UPPER DIRECTION |
| −315° | 023A | 7 IN UPPER DIRECTION |
| −360° | 024A | 8 IN UPPER DIRECTION |

| FINGER-SLIDE | KEY CODE | CONTENTS' ORDINAL RANKS |
|---|---|---|
| +45° | 009A | 13 |
| +90° | 010A | 25 |
| +135° | 011A | 37 |
| +180° | 012A | 49 |
| +225° | 013A | 61 |
| +270° | 014A | 73 |
| +315° | 015A | 85 |
| +360° | 016A | 1 |
| −45° | 017A | 85 |
| −90° | 018A | 73 |
| −135° | 019A | 61 |
| −180° | 020A | 49 |
| −225° | 021A | 37 |
| −270° | 022A | 25 |
| −315° | 023A | 13 |
| −360° | 024A | 1 |

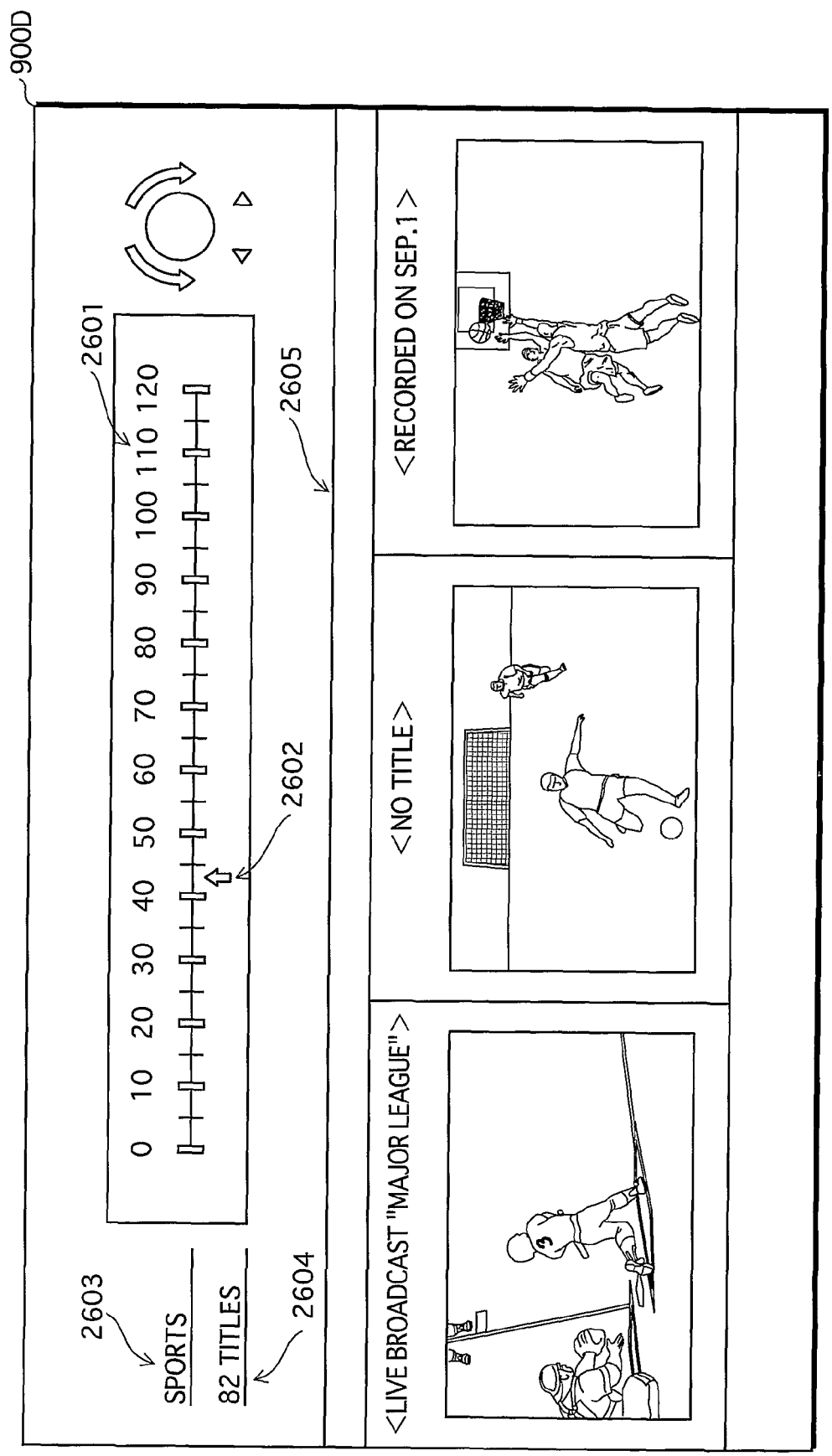

USER INTERFACE APPARATUS, PROGRAM AND RECORDING MEDIUM

TECHNICAL FIELD

The present invention relates to a user interface technology for receiving a selection from among alternatives respectively representing objects displayed on a screen, based on a user operation directed to operation members. In particular, the present invention relates to improvement for operability in the user interface technology.

BACKGROUND ART

Currently, audiovisual apparatuses (AV apparatus), which can obtain various contents via various media, have been developed. Examples of the contents are images (still images and moving images), music, web pages, and application programs. One example of the AV apparatuses is an HDD-installed DVD recorder (hard disk drive installed digital versatile disk recorder).

Such an AV apparatus has to have a function to allow users to select one of the contents stored in recording media including the HDD and the DVD, and the broadcast contents. Conventionally, a menu-interaction type GUI (graphical user interface) realizes the function by displaying alternatives of the contents as a list on the screen and receiving a selection from the list, from which a user can perform selection for playback, execution, or recording.

For example, the HDD-installed DVD recorder disclosed by non-patent reference 1 (see below) performs as follows. When the HDD-installed DVD recorder receives a user instruction for a contents selection screen display, displays, names and thumbnails of the contents stored either in an HDD or a DVD, in the form of a list. The list is divided into pages so that one page contains a predetermined number of alternatives arranged in a predetermined order (e.g. descending order of stored dates, or according to channels).

In addition, conventional operation members used in the GUI are a mouse, a ten key, and a jog dial. However, the information inputting apparatus displayed by the following patent reference 1 may also be used.
(Non-Patent Reference 1)
Internet reference
URL:http://panasonic.jp/dvd/recorder/e200h/spec/01.html
(Patent reference 1)
Japanese laid-open patent application No. 2001-184158

Such AV apparatuses as described above can select a desired content from among enormous amounts of contents recorded in an HDD, a DVD, and the like, for playback or for execution at any time. However, the GUI operation for the selection is expected to be troublesome.

For example, suppose using a conventional AV apparatus that can display a list of eight alternatives in a page. When an alternative indicating a desired content exists at page 50, the user has to reach the page 50 by repeating a page-turning operation directed to the operation member many times.

In addition, when the AV apparatus can display the selectable contents as a list by thumbnails, it takes time to process for displaying the list. Accordingly, there will be a lag between the user's instruction operation for turning pages and an actual list display switch. As a result, the user would feel stress because he cannot select the desired contents easily because the list display switch is not displayed smoothly.

If all the selectable alternatives can be displayed as a list at once, it is no longer necessary to turn pages. However, if there are thousands of the selectable alternatives, it takes a great amount of time to generate the list, and the user has to operate the operation members many times to reach a desired alternative in the list. This might worsen the operability even compared to the conventional case.

In view of the above, the present invention has an object of providing a user interface apparatus with improved operability in selection of a desired content from among many alternatives compared to conventional cases, and of providing various technologies relating to such a user interface apparatus.

DISCLOSURE OF THE INVENTION

So as to achieve the above-described object, the present invention provides a user interface apparatus having: an operation member on which at least three operations are possible; a managing unit operable to manage n alternatives by assigning thereto respective ordinal ranks; a setting unit operable to set, as selectable, m alternatives from among the n alternatives, where n and m are integers satisfying n>m>1; a first receiving unit operable to receive selection of one of the m alternatives, according to a first operation directed to the operation member; a first display control unit operable to control to display, in a display apparatus, a first set of alternatives in a predetermined number including the alternative whose selection has been received by the first receiving unit, where the alternatives in the first set are consecutive in terms of ordinal ranks and are among the n alternatives managed in the managing unit; a second display control unit operable to control to display, in the display apparatus, a second set of alternatives different from the first set of alternatives, according to a second operation directed to the operation member; and a second receiving unit operable to receive selection of a desired alternative from the second set of alternatives displayed by the second display control unit, according to a third operation directed to the operation member.

<Action>

According to the above-stated structure, when a user performs a first operation to select alternatives out of all the alternatives set by the setting unit, the selected alternatives having ordinal ranks close to the ordinal rank of a desired alternative. Accordingly, the user interface apparatus can display a first set of alternatives in a predetermined number including the alternative whose selection has been received by the first receiving unit, where the alternatives in the first set are consecutive in terms of ordinal ranks and are among the n alternatives managed in the managing unit. In addition, even when a desired alternative is not displayed in the display apparatus, a second operation can enable a second set of alternatives different from the first set of alternatives to be displayed.

Here, the second set of alternatives may include part of the first set of alternatives, or may not include any of the first set of alternatives at all.

In addition, the operation member may be in an disk form or an oval form, be operable to be rotated with the center of the disk or of the oval as an axis, and be provided with: a decision button at the center of the operation member; and m directional buttons in radial formation with a center being the decision button.

In addition, a program according to the present invention is a program for making a computer perform selection reception processing, where the computer includes an operation member on which at least three operations are possible and manages alternatives by assigning thereto respective ordinal ranks, the selection reception processing having: a setting step of setting as selectable, m alternatives from among the n alternatives, where n and m are integers satisfying n>m>1; a first receiving step of receiving selection of one of the m alternatives, according to a first operation directed to the operation member; a first display control step of controlling to display, in a display apparatus, a first set of alternatives in a predetermined number including the alternative whose selection has been received in the first receiving step, where the alternatives in the first set are consecutive in terms of ordinal ranks and are among the n alternatives managed in the computer; a second display control step of controlling to display, in the display apparatus, a second set of alternatives different from the first set of alternatives, according to a second operation directed to the operation member; and a second receiving step of receiving selection of a desired alternative from the second set of alternatives displayed by the second display control step, according to a third operation directed to the operation member.

Furthermore, a recording medium according to the present invention records therein the above-described program.

In addition, a selection reception method according to the present invention is a selection reception method used in a computer that includes an operation member on which at least three operations are possible and that manages alternatives by assigning thereto respective ordinal ranks, the selection reception processing having: a setting step of setting as selectable, m alternatives from among the n alternatives, where n and m are integers satisfying n>m>1; a first receiving step of receiving selection of one of the m alternatives, according to a first operation directed to the operation member; a first display control step of controlling to display, in a display apparatus, a first set of alternatives in a predetermined number including the alternative whose selection has been received in the first receiving step, where the alternatives in the first set are consecutive in terms of ordinal ranks and are among the n alternatives managed in the computer; a second display control step of controlling to display, in the display apparatus, a second set of alternatives different from the first set of alternatives, according to a second operation directed to the operation member; and a second receiving step of receiving selection of a desired alternative from the second set of alternatives displayed by the second display control step, according to a third operation directed to the operation member.

<Effect>

With a user interface apparatus having the above-described structure, a user is able to display in a display apparatus a desired alternative by performing first and second operations for the operation member. Therefore, the number of operations necessary for reaching a desired alternative is reduced remarkably compared to conventional GUIs for selection reception.

Here, a structure is possible in which the operation member is operable to be pressed and rotated, the user interface apparatus has a first detection unit operable to detect a press operation directed to the operation member and a second detection unit operable to detect a rotation operation directed to the operation member, the first reception unit receives selection of one of the m alternatives, according to the single press operation that the first detection unit has detected, and the second display control unit controls to display, in the display apparatus, the second set of alternatives, according to the rotation operation that the second detection unit has detected.

With a user interface apparatus having the above-described structure, a user is able to select, from among the set selectable alternatives, an alternative whose ordinal rank is close to the ordinal rank of the desired alternative by performing only one press operation for the operation member, and further to make fine adjustments for display of alternatives by means of the rotation operation.

Here, a structure is possible in which the operation member is operable to be pressed and rotated, the user interface apparatus has a first detection unit operable to detect a rotation operation directed to the operation member and a second detection unit operable to detect a press operation directed to the operation member, the first reception unit receives selection of one of the m alternatives, according to the single rotation operation that the first detection unit has detected, and the second display control unit controls to display, in the display apparatus, the second set of alternatives, according to the press operation that the second detection unit has detected.

With a user interface apparatus having the above-described structure, a user is able to select, from among the set selectable alternatives, an alternative whose ordinal rank is close to the ordinal rank of the desired alternative by performing only one rotation operation for the operation member, and further to make fine adjustments for display of alternatives by means of the press operation.

Here, a structure is possible in which the operation member contains at least m press operation sub-members, the user interface apparatus has a table creation unit operable to create a table in which ordinal ranks of them alternatives are associated with m pieces of operation information corresponding to press operations respectively directed to the m press operation sub-members, the first detection unit detects a press operation directed to one of the press operation sub-members, and the first reception unit receives selection of an alternative whose ordinal rank is associated with a piece of operation information corresponding to the press operation that the first detection unit has detected.

A user interface apparatus having the above-described structure is able to create a table in which ordinal ranks of the set selectable alternatives are respectively associated with press operation sub-members. Accordingly, a user is able to select an alternative whose ordinal rank is close to the ordinal rank of the desired alternative, by only pressing any one of the m press operation sub-members.

Here, a structure is possible in which the press operation sub-members are disposed in a particular formation, and the user interface apparatus further has a third display control unit operable to control to display, in the display apparatus, a user interface screen on which ordinal ranks of the m alternatives are disposed in the particular formation.

With a user interface apparatus having the above-described structure, a user is able to select an alternative whose ordinal rank is close to the ordinal rank of the desired alternative, by looking at the m ordinal ranks displayed on the screen.

Here, a structure is possible in which the press operation sub-members are disposed in a particular formation, the n alternatives are contents recorded in a storage unit, the managing unit manages the n contents in descending order of dates recorded into the storage unit, and the user interface apparatus further has a third display control unit operable to control to display, in the display apparatus, a user interface screen on which recorded dates of contents whose ordinal ranks are associated with the m pieces of operation information in the table are disposed in the particular formation.

With a user interface apparatus having the above-described structure, a user is able to select a content whose recorded date is close to the recorded date of the desired content, by looking at the m recorded dates displayed on the screen.

Here, a structure is possible in which the press operation sub-members are disposed in a particular formation, the n alternatives are contents recorded in a storage unit, the managing unit manages the n contents in descending order of number of times played back, and the user interface apparatus further has a third display control unit operable to control to display, in the display apparatus, a user interface screen on which number of times played back for contents whose ordinal ranks are associated with the m pieces of operation information in the table are disposed in the particular formation.

With a user interface apparatus having the above-described structure, a user is able to select a content whose number of times played back is close to the number of times played back for the desired content, by looking at the m pieces of information displayed on the screen which respectively correspond to number of times played back.

Here, a structure is possible in which the press operation sub-members are disposed in a particular formation, the n alternatives are contents recorded in a storage unit, the managing unit manages the n contents, in one of an order of the Japanese syllabary and an alphabetical order, and the user interface apparatus further has a third display control unit operable to control to display, in the display apparatus, a user interface screen on which initials of titles of contents whose ordinal ranks are associated with the m pieces of operation information in the table are disposed in the particular formation.

With a user interface apparatus having the above-described structure, a user is able to select a content whose title's initial is close to the title's initial of the desired content, by looking at the m initials displayed on the screen.

Here, a structure is possible in which the press operation sub-members are disposed in a particular formation, and the user interface apparatus further has a third display control unit operable to control to display, in the display apparatus, a user interface screen on which titles of the m alternatives are disposed in the particular formation.

With a user interface apparatus having the above-described structure, a user is able to select an alternative whose ordinal rank is expected to be close to the ordinal rank of the desired alternative, by looking at the m alternatives displayed on the screen.

Here, a structure is possible in which the press operation sub-members are disposed in a particular formation, the n alternatives are scheduled programs which are objects of record presetting, the managing unit manages the n scheduled programs in descending order of broadcast time, and the user interface apparatus further has a third display control unit operable to control to display, in the display apparatus, a user interface screen on which broadcast times for scheduled programs whose ordinal ranks are associated with the m pieces of operation information in the table are disposed in the particular formation.

With a user interface apparatus having the above-described structure, a user is able to select an alternative whose broadcast time is close to the broadcast time of the desired scheduled program, by looking at the m pieces of information displayed on the screen which respectively correspond to broadcast time.

Here, a structure is possible in which the press operation sub-members are disposed in a particular formation, the n alternatives are program channels, the managing unit manages the n program channels in descending order, and the user interface apparatus further has a third display control unit operable to control to display, in the display apparatus, a user interface screen on which program channels whose ordinal ranks are associated with the m pieces of operation information in the table are disposed in the particular formation.

With a user interface apparatus having the above-described structure, a user is able to select a program channel that is close to the desired program channel, by looking at the m program channels displayed on the screen.

Here, the user interface apparatus may further have a first detection unit operable to detect a touched position of the operation member; and a second detection unit operable to detect a sliding operation directed to the operation member, where the first receiving unit receives selection of one of the m alternatives, according to the touched position that the first detection unit has detected, and the second display control unit controls to display, in the display apparatus, the second set of alternatives, according to the sliding operation that the second detection unit has detected.

With the above-described structure, a user is able to select, from among the set selectable alternatives, an alternative whose ordinal rank is close to the ordinal rank of the desired alternative by performing only one touch operation for the operation member, and further to make fine adjustments for display of alternatives by means of the sliding operation.

Here, the user interface apparatus may further have: a first detection unit operable to detect a sliding operation directed to the operation member; and a second detection unit operable to detect a touched position of the operation member, where the first receiving unit receives selection of one of the m alternatives, according to the single sliding operation that the first detection unit has detected, and the second display control unit controls to display, in the display apparatus, the second set of alternatives, according to the touched position that the second detection unit has detected.

With the above-described structure, a user is able to select, from among the set selectable alternatives, an alternative whose ordinal rank is close to the ordinal rank of the desired alternative by performing only one sliding operation directed to the operation member, and further to make fine adjustments for display of alternatives by means of the touch operation.

Here, a structure is possible in which the setting unit sets, as selectable, the m alternatives out of the n alternatives, in constant intervals.

With the stated structure, it is possible to define m ordinal ranks in constant intervals.

Here, a structure is possible in which when the alternatives managed by the managing unit have changed in number or in ordinal ranks, the setting unit sets new m alternatives as selectable.

With the stated structure, when there is change in number of ordinal ranks of the set selectable alternatives, the setting unit performs another setting for setting new selectable alternatives. Therefore, the selection reception processing is performed more smoothly than in a conventional case where setting for the selectable alternatives is performed upon reception of a user instruction for displaying a selection reception screen.

Here, the user interface apparatus may further have a third reception unit operable to receive a user instruction of a rule according to which the m alternatives are selected out of the n alternatives, and the setting unit sets the m alternatives as selectable according to the rule instructed by the user.

With the stated structure, a user can define a rule according to which selectable alternatives are selected. Accordingly, set selectable alternatives are more convenient for the user. This enhances operability.

BRIEF DESCRIPTION OF THE DRAWINGS

FIG. 3 is an exploded perspective diagram of an operation member 31 of the remote controller 3.

FIG. 4A shows a plan view of an upper surface of an operation knob 311 viewed from above, and a sectional view of the operation member 31 cut at an axis A-A' vertically with respect to the plane.

FIG. 4B is a plan view of an upper surface of the operation member 31 viewed from above.

FIG. 4C is a diagram for explaining an operation of a brush 312 of the operation member 31.

FIG. 8 shows one example of a table in which eight press sensors are associated with ordinal ranks of eight contents set as selectable alternatives based on the table 700 of FIG. 7.

FIG. 10 is a diagram showing one example of a table in which rotation operations are associated with moving amounts of alternatives displayed on a screen.

FIG. 12 is a diagram showing one example of a table in which ordinal ranks of eight contents selected from the table 700 of FIG. 7 are associated with respective rotation operations.

FIG. 14 is a diagram showing an external view of a remote controller 3A.

FIG. 19 is one example of a table in which sliding operations are associated with moving amounts of alternatives displayed on a screen.

FIG. 21 shows one example of a table in which sliding operations are associated with ordinal ranks of eight contents set as selectable alternatives based on the table 700 in FIG. 7.

FIG. 26 shows one example of a GUI screen for receiving a selection of a content to be played back.

BEST MODE FOR CARRYING OUT THE INVENTION

The following describes a STB (set top box) being one embodiment of the present invention, with reference to the drawings.

1. Structure of STB

Figure 1:
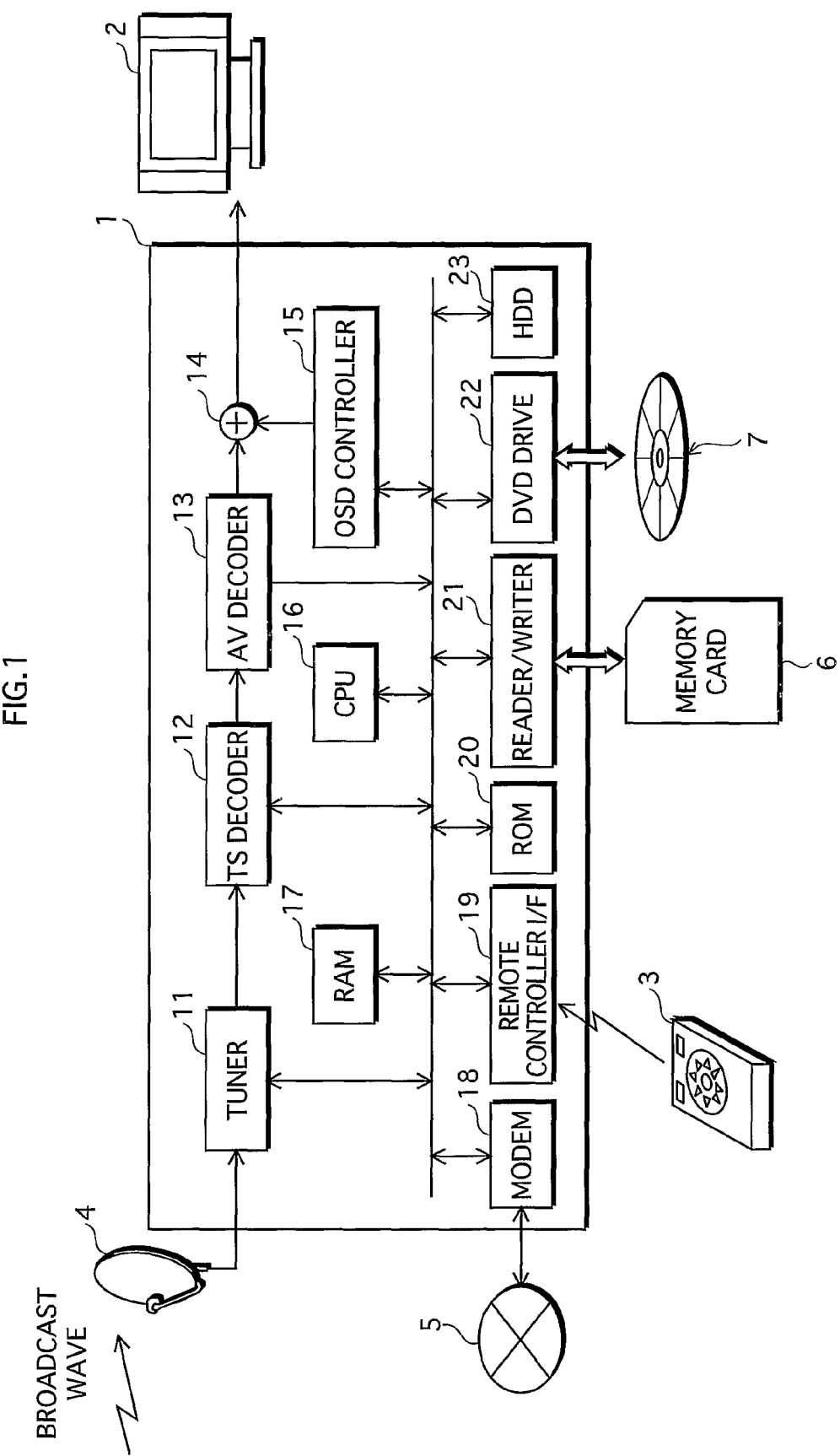
FIG. 1 is a diagram showing a structure of an STB 1, being one embodiment of the present invention.

FIG. 1 is a diagram showing a structure of an STB 1.

The STB 1 is connected to an antenna 4, a network 5, and a display apparatus 2. The STB 1 has such hardware as: a tuner 11, a TS decoder 12, an AV decoder 13, a synthesizing processing unit 14, an OSD controller 15, a CPU 16, a RAM 17, a modem 18, a remote controller interface (I/F) 19, a ROM 20, a reader/writer 21, a DVD drive 22, and an HDD 23.

By the CPU 16 executing a control program stored in the ROM 20 or the HDD 23 to control the hardware, the STB 1 realizes such functions as a GUI function, a digital broadcast reception function, an internet communication function, a memory-card read/write function, a DVD read/write function, a contents playback/execution function, and a contents record function. Here, the contents are images (still images and moving images), music, web pages, application programs, and the like.

The STB 1 includes a remote controller 3. When a user operates operation members provided for the remote controller 3, the STB 1 is able to receive corresponding user operations.

For example, when receiving from the remote controller 3 a remote control code indicating an instruction for displaying a contents selection reception screen, the STB 1 displays on the display apparatus 2 a list of alternatives corresponding to selectable contents, and performs processing for receiving one alternative from the list based on a user operation directed to the operation members. Hereinafter, the processing is referred to as "selection reception processing". Such selection reception processing is one kind of processing included in the control program.

The tuner 11 performs digital demodulation and error correction for the broadcast waves received by the antenna 4, and outputs resulting transport streams (TS) to the TS decoder 12.

The TS decoder 12 decodes TS packets constituting a TS inputted from the tuner 11, makes selection therefrom and takes out packetized elementary streams (PES) or sections, and outputs them to the AV decoder 13 or to the RAM 17.

The AV decoder 13 performs a series of contents playback processing such as decompressing contents data of image/audio compressed using a coding method in accordance with the MPEG (moving picture experts group) standard, and synchronously outputting and D/A converting image/audio, and outputs obtained signals to the synthesizing processing unit 14.

The OSD controller 15 generates graphics such as a GUI screen. For example, the OSD controller 15 generates the contents selection reception screen. Thus generated graphics signals are outputted to the synthesizing processing unit 14.

The synthesizing processing unit 14 synthesizes image signals outputted from the AV decoder 13, and graphic signals outputted from the OSD controller 15, and outputs the synthesized signals to the display apparatus 2.

The modem 18 is used to communicate with other apparatuses connected to the network 5. For example, the modem 18 can obtain contents from a contents server connected to the network 5. The obtained contents is stored in the HDD 23, or subjected to a sequential playback processing in the AV decoder 13 after having been temporarily stored in the RAM 17 as a buffer.

The remote controller I/F 19 is an interface used in receiving a remote control code transmitted from the remote controller 3 using an infrared wireless communication method.

The reader/writer 21 reads contents from the memory card 6 inserted thereto, and writes contents to the memory card 6.

The DVD drive 22 reads contents from the DVD 7 being set thereto, and writes contents to a DVD 7, if the DVD 7 is writable such as a DVD-R, a DVD-RW, and a DVD-RAM.

The HDD 23 is an apparatus that performs writing/reading of contents to/from a hard disk, where examples of the contents are contents obtained by the modem 18 from the contents server, contents read by the reader/writer 21, and the contents read by the DVD drive 22.

The STB 1 manages various contents, which can be played back, executed, or recorded, by assigning them respective ordinal ranks. For example, contents recorded in the HDD 23 are managed in the descending order of the recorded dates. As to broadcast contents, the STB 1 receives EPG (electronic program guide) sent from a broadcast station as section data, and manages the broadcast contents according to the corresponding broadcast time, by referring to the EPG. As to contents recorded in a DVD (e.g. movie), the order of scenes of the movie contents is managed by referring to the management sheet recorded in the DVD.

The contents are also classified under various groups, such as types of contents (movie, music, game, and so on), categories of movies (action movies, romantic movies, and so on), recording media (DVD, HDD, memory card, and so on), and broadcast channels.

2. Remote Controller

The following describes the remote controller 3.

The remote controller 3 is equipped with various operation members. When a user operates the operation members, the remote controller 3 transmits a remote control code that is in accordance with the user operation, in the infrared wireless communication method. The STB 1 receives a user instruction by receiving the remote control code transmitted from the remote controller 3.

Figure 2:
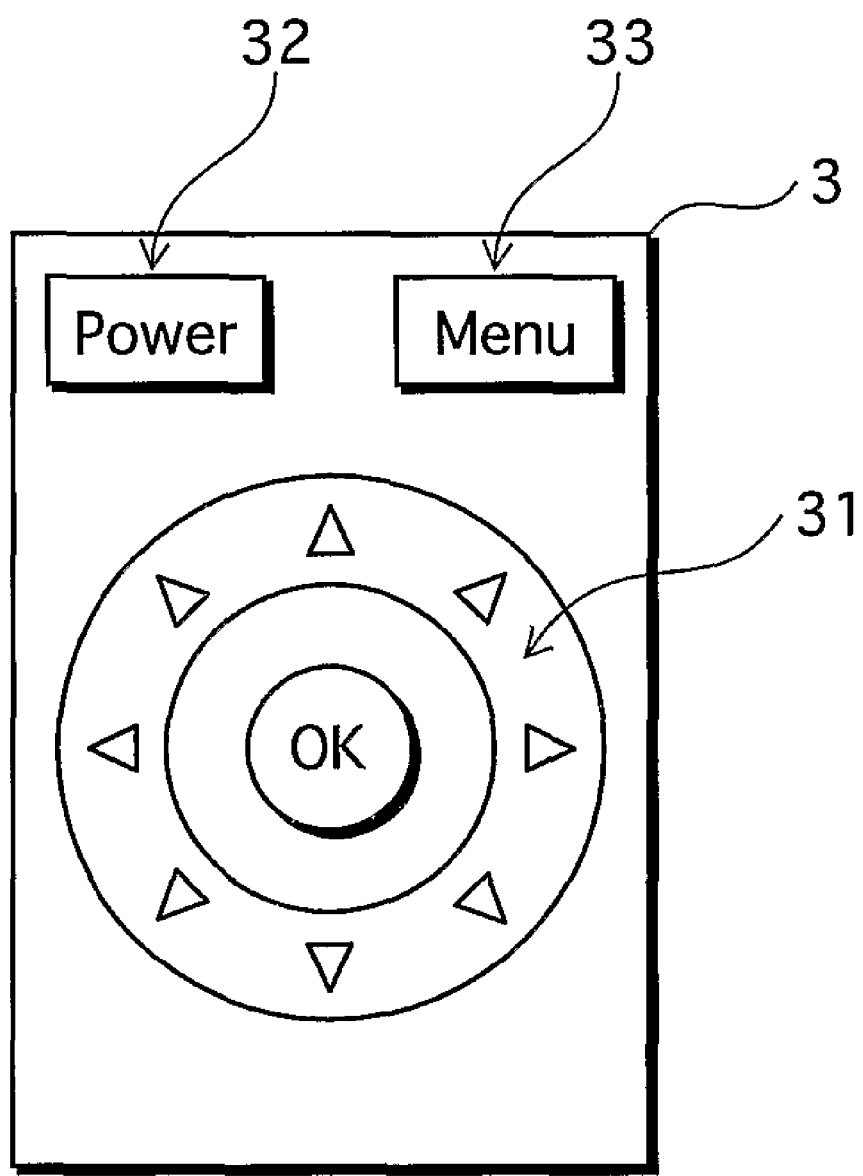
FIG. 2 is a diagram showing an external view of a remote controller 3.

FIG. 2 is a diagram showing an external view of the remote controller 3.

The remote controller 3 is equipped with operation members 31, 32, and 33.

The operation member 32 is a key for receiving a press operation. When the operation member 32 is pressed, a remote control code for instructing ON/OFF of the main power is transmitted to the STB 1.

The operation member 33 is also a key for receiving a press operation. When the operation member 33 is pressed, a remote control code for instructing display of the contents selection reception screen is transmitted to the STB 1.

The operation member 31 is a key that can be both pressed and rotated. The operation member 31 is a combination of a conventional ten key and a jog dial.

The following details the structure of this operation member 31.

<2.1 Structure of Operation Member 31>

FIG. 3 is an exploded perspective diagram of the operation member 31 of the remote controller 3.

In this drawing, the reference number "34" represents an upper case of the remote controller, "36" represents a lower case of the remote controller, and "35" represents a multi-layer wiring substrate. The multi-layer wiring substrate 35 is supported by the lower case 36.

On the multi-layer substrate 35, eight rotation sensors 313a, 313b, 313c, 313d, 313e, 313f, 313g, and 313h are provided in a circular formation. A press sensor 314i is provided in the center of the circle. A conductive member 315, in a circular form, is provided inside the circle of the rotation sensors to surround the press sensor 314i.

On the upper surfaces of the eight rotation sensors 313a, 313b, 313c, 313d, 313e, 313f, 313g, and 313h, press sensors 314a, 314b, 314c, 314d, 314e, 314f, 314g, and 314h are respectively attached.

An operation knob 311, being a portion of the operating member 31 to be in contact with a user, is made up of: a disk-form member 311A made of an elastic insulation resin; a tubular member 311B whose surface is provided with a conductive coating; and a brush 312 made of conductive elastic member. The operation knob 311 is disposed on the conductive member 315.

The upper surface of the upper case 34 has a round through hole 34A. It is designed so that the operation knob 311 will be exposed over the upper case 34 through the through hole 34A.

The brush 312 is conducted through the member 311B and the conductive member 315, by touching a side surface of any of the rotation sensors 313a, 313b, 313c, 313d, 313e, 313f, 313g, and 313h, thereby transmitting a signal to a later-described rotation operation detection unit 302. Note that each of the rotation sensors is provided with a different level of resistance. Therefore a voltage value outputted to the rotation operation detection unit 302 when the brush 312 comes in contact with a rotation sensor differs for each rotation sensor. Accordingly, from a voltage value and an amount of change thereof, it is possible to determine a direction and an amount of the rotation.

FIG. 4A shows a plan view of the upper surface of the operation knob 311 viewed from above, and a sectional view of the operation member 31 cut at an axis A-A' vertically with respect to the plane.

A hole is provided at the center of the upper surface of the member 311A of the operation member 31. The hole accommodates a nail-like member 310. The upper surface of the member 311A is provided with eight portions convex in the form of triangle (A). The eight convex portions extend radially so as to represent eight directions. Towards the lower surface side of the member 311A, eight brim portions sticking outward are provided, the eight brim portions corresponding to the eight convex portions respectively.

As shown in this drawing, eight portions, each of which is formed by a convex portion and a brim portion, are named press portions 311a, 311b, 311c, 311d, 311e, 311f, 311g, and 311h.

As is clear from these drawings, the brim portions of the above-named press portions function to prevent the operation member 31 from falling off through the through hole 34A of the upper case 34.

In addition, when any of the convex portions of the above-described press portions is pressed (e.g. the convex portion of the press portion 311c), the corresponding brim presses a press sensor (e.g. press sensor 314c) provided on a corresponding one of the upper surfaces of the above-described rotation sensors.

When the member 310 is pressed, the lower end thereof will press the press sensor 314i.

The press sensors 314a, 314b, 314c, 314d, 314e, 314f, 314g, 314h, and 314i are conducted by being pressed. An electric current, having different level of voltage for each press sensor actually pressed, is sent to a press operation detection unit 301 detailed later.

Next, a rotation operation of the operation member 31 is described.

FIG. 4B is a plan view of the upper surface of the operation member 31 viewed from above, and FIG. 4C is a diagram for explaining an operation of the brush 312 of the operation member 31.

As FIG. 4B shows, the operation member 31 can be rotated in the circumferential direction of the member 311A.

When the operation member 31 is rotated in the circumferential direction as shown by the open arrow in this drawing, the brush 312 is also rotated in the same circumferential direction.

The brush 312, and the rotation sensors 313a, 313b, 313c, 313d, 313e, 313f, 313g, 313h have magnetic properties. Accordingly, the brush 312 is attracted to any of the rotation sensors to be in contact thereto, by means of its magnetic power.

When the brush 312 and a rotation sensor are brought into contact, they will be conducted to each other, and an electric current having a voltage value different for each rotation sensor is sent to the rotation operation detection unit 302 detailed later.

<2.2 Functional Structure of Remote Controller 3>

The functional structure of the remote controller 3 is described as follows.

Figure 5:
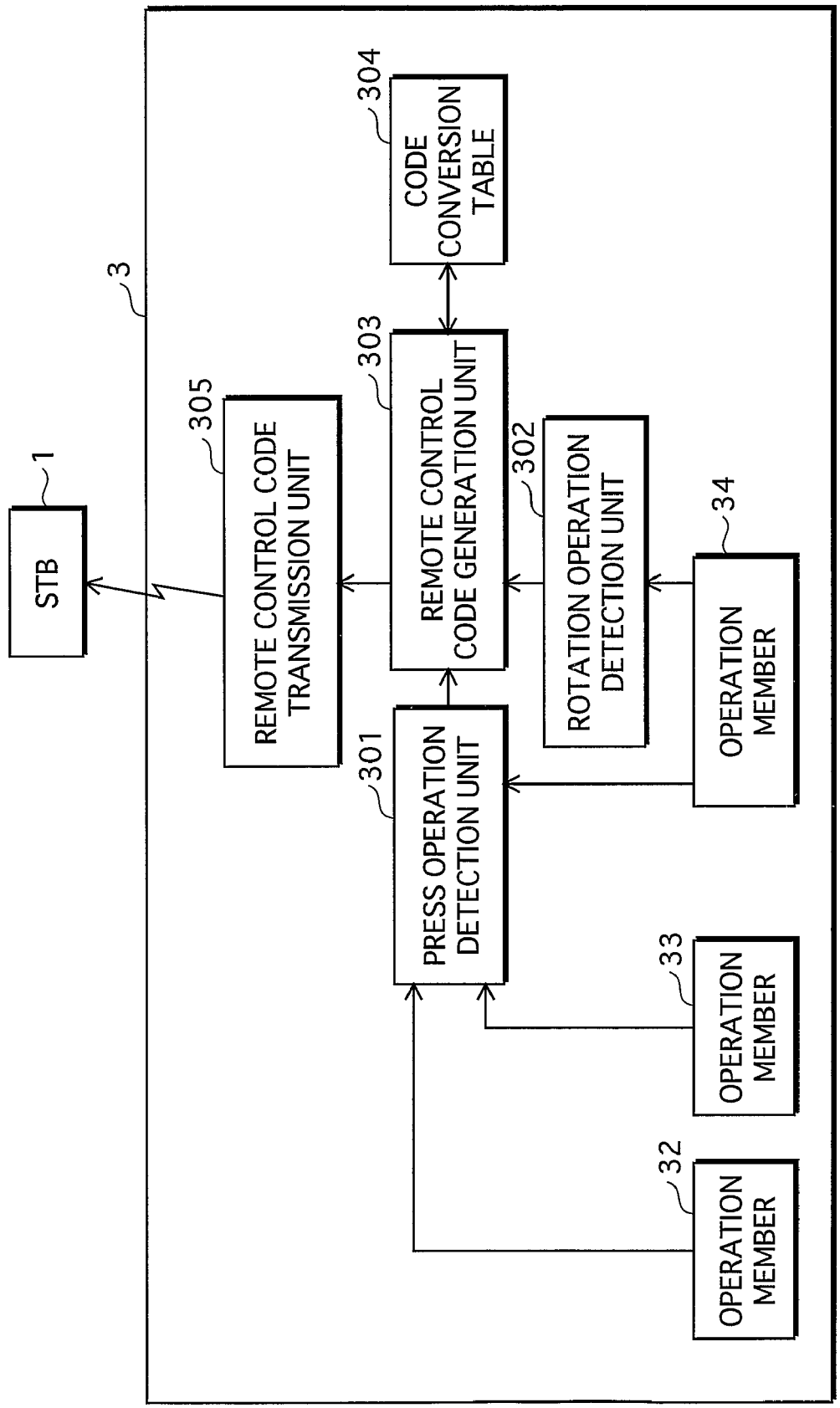
FIG. 5 is a block diagram showing a functional structure of the remote controller 3.

FIG. 5 is a block diagram showing the functional structure of the remote controller 3.

From a functional point of view, the remote controller 3 is equipped with the operation members 31, 32, and 33, the press operation detection unit 301, a rotation operation detection unit 302, a remote control code generation unit 303, a code conversion table 304, and a remote control code transmission unit 305.

The press operation detection unit 301 detects a voltage of an electric current that runs in response to a press operation directed to the operation members 31, 32, and 33. The detected value of the voltage is sent to the remote control code generation unit 303.

The rotation operation detection unit 302 detects a voltage of an electric current that runs in response to a rotation operation directed to the operation member 31. The detected value of the voltage is sent to the remote control code generation unit 303.

The code conversion table 304 is a table in which values, of voltages are associated with remote control codes.

The remote control code generation unit 303 generates a remote control code, using a voltage value detected by the press operation detection unit 301 and the rotation operation detection unit 302, and by referring to the code conversion table 304. The remote control code generation unit 303 sends the generated remote control code to the remote control code transmission unit 305.

When the press sensor 314a (see FIG. 3) is pressed, for example, the remote control code generation unit 303 generates a remote control code that includes a key code 001 associated with the voltage value having outputted by the press.

The remote control code transmission unit 305 transmits the remote control code generated by the remote control code generation unit 303, to the remote controller I/F 19 of the STB 1 in the infrared wireless communication method.

3. Operation

The following describes contents selection reception processing, which characterizes the present invention.

Figure 6:
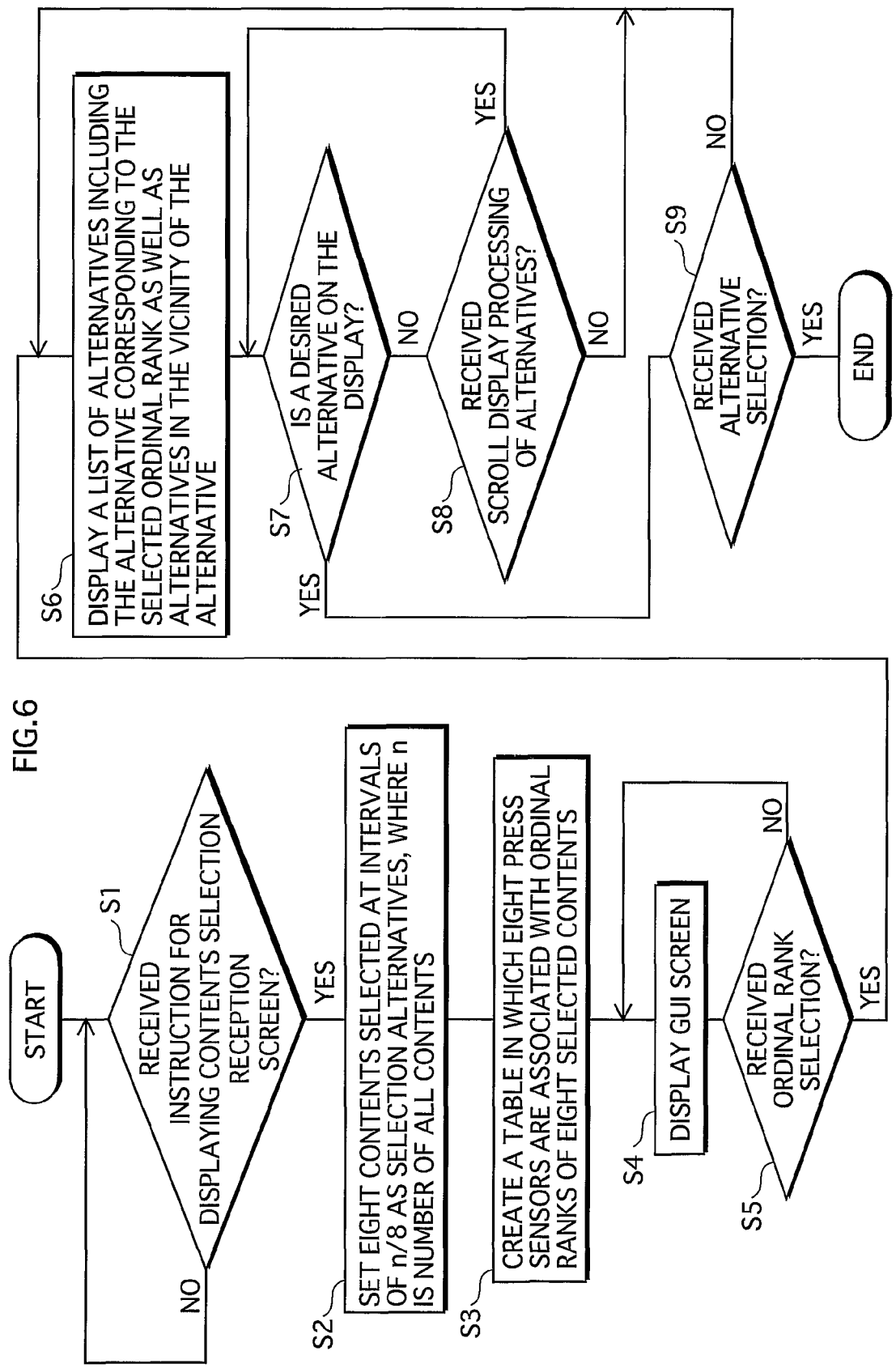
FIG. 6 is a flowchart for describing selection reception processing.

FIG. 6 is a flowchart for describing the selection reception processing.

First, the STB 1, receiving a user instruction to display a contents selection reception screen (Step S1: YES), calculates a value by dividing, by 8, the number "n" of contents stored in the HDD 23 or the like and managed by being assigned respective ordinal ranks. The number 8 is the number of the press sensors 314a, 314b, 314c, 314d, 314e, 314f, 314g, and 314h. Then, eight contents are selected from among the n contents at intervals of the calculated value. The selected eight contents are set as selectable alternatives (Step S2).

A table is created in which the ordinal ranks of the selectable alternatives are associated with the eight press sensors (Step S3). Based on this table, a GUI screen for receiving the ordinal rank selection is displayed (Step S4).

A user then operates the operation member 31 by looking at the displayed GUI screen, to select an ordinal rank. When the STB 1 receives an ordinal-rank selection (Step S5: YES), displays in the display apparatus 3 a list of alternatives showing a predetermined number of selectable alternatives including an alternative corresponding to the selected ordinal-rank, as well as alternatives in the vicinity of the alternative (Step S6). When the STB 1 does not receive any ordinal-rank selection in Step S5, the control returns to Step S4.

In the case where a desired alternative is included in the displayed list of alternatives (Step S7: YES), when the user operates the operation member 31 thereby selecting the desired alternative (Step S9: YES), the selection reception processing ends.

If the desired alternative is not included in the displayed list of alternatives (Step S7: NO), the user is allowed to scroll through all the selectable alternatives by displaying them on the screen, by operating the operation member 31. When such scroll display processing is received by the STB 1 (Step S8: YES), the control returns to Step S7.

When the STB 1 does not receive any such scroll display processing (Step S8: NO), the control returns to Step S6.

<3.1 Concrete Operation Example (1)>

The following describes a concrete example of the selection reception processing described above.

Figure 7:
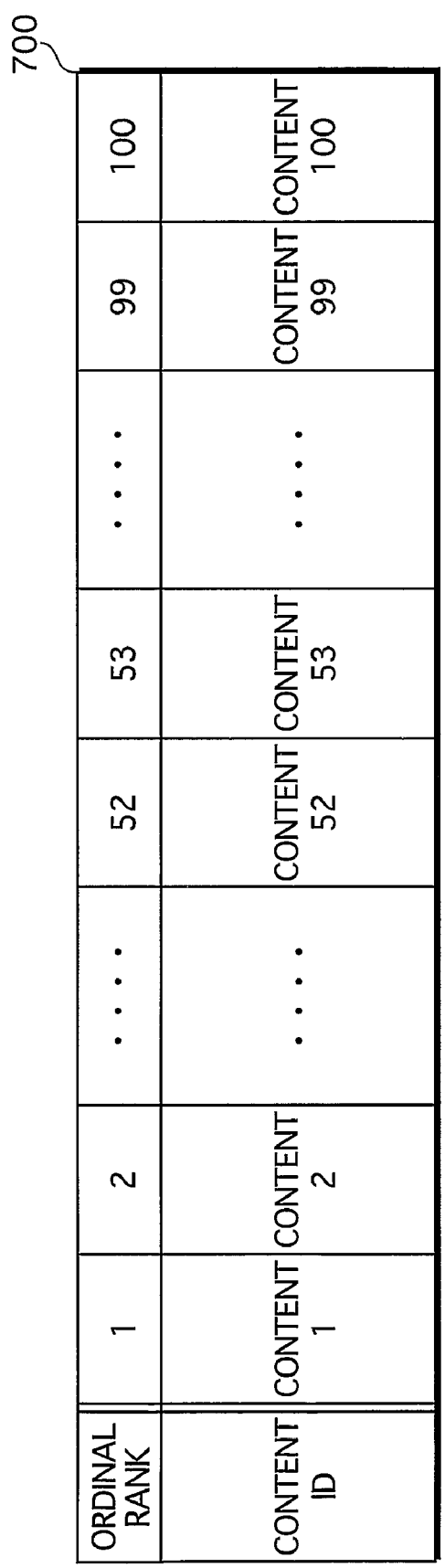
FIG. 7 is a diagram showing one example of a management table for contents managed by being assigned ordinal ranks.

FIG. 7 is a diagram showing one example of a management table for contents recorded and managed in the HDD 23. The table 700 in FIG. 7 shows that 100 contents (content 1-content 100) are recorded in the HDD 23.

FIG. 8 shows one example of a table created in Step S3 described above, in which eight press sensors are associated with ordinal ranks of eight contents set as selectable alternatives from the table 700.

In FIG. 8, the key name column is unnecessary in a practical sense, but is shown to facilitate understanding.

Each key code is a key code included in a remote control code transmitted from the remote controller 3 in response to pressing of each press sensor. When a press sensor 314a (key name: upper) shown in FIG. 3 is pressed, the key code 001 is transmitted from the remote controller 3 by being included in a remote control code. Likewise, when the press sensor 314b (key name: upper right) is pressed, the key code 002 is transmitted. When the press sensor 314c (key name: right) is pressed, the key code 003 is transmitted, when the press sensor 314*d* (key name: lower right) is pressed, the key code 004 is transmitted. When the press sensor 314*e* (key name: lower) is pressed, the key code 005 is transmitted. When the press sensor 314*f* (key name: lower left) is pressed, the key code 006 is transmitted. When the press sensor 314*g* (key name: left) is pressed, the key code 007 is transmitted. When the press sensor 314*h* (key name: upper left) is pressed, the key code 008 is transmitted. Each of the above key codes is transmitted from the remote controller 3 by being included in a remote control code as in the case of the key code 001.

In the table 800, these key codes and ordinal ranks of the selected contents set as the alternatives are associated in one-to-one.

The selected contents' ordinal ranks are 1, 13, 25, 37, 49, 61, 73, and 85, which are eight ordinal ranks that are selected from n=100 (number of contents recorded in the HDD 23) at intervals of 12 calculated by dividing 100 by 8, where 8 corresponds to the number of the press sensors.

In the table 800, the key code 001 and the ordinal rank 1; the key code 002 and the ordinal rank 13; the key code 003 and the ordinal rank 25; the key code 004 and the ordinal rank 37; the key code 005 and the ordinal rank 49; the key code 006 and the ordinal rank 61; the key code 007 and the ordinal rank 73; and the key code 008 and the ordinal rank 85 are respectively associated to each other.

Figure 9:
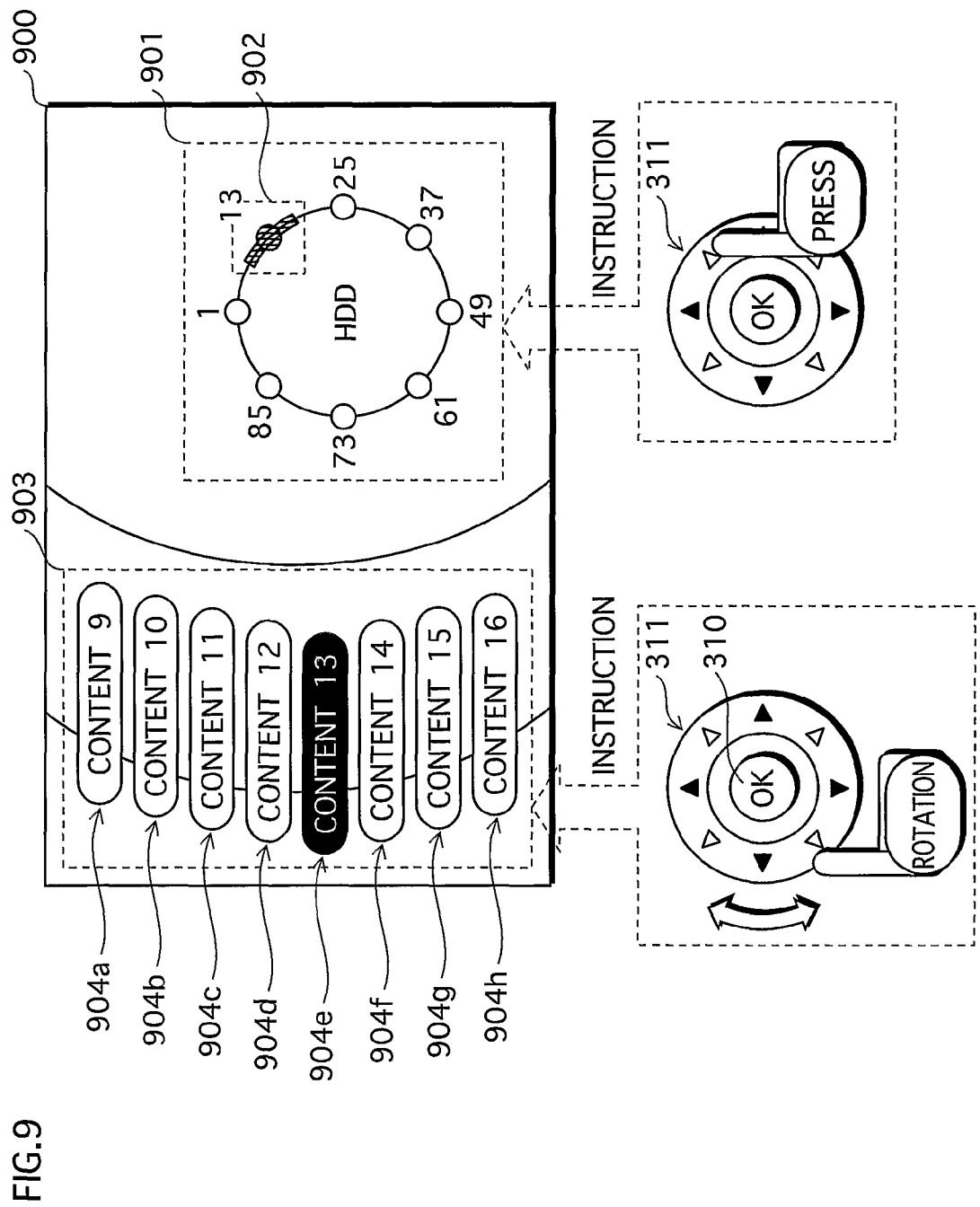
FIG. 9 is a diagram for describing selection reception processing in a concrete operation example (1).

FIG. 9 is a diagram for describing the selection reception processing in the concrete operation example (1).

The GUI screen 900 is a GUI screen for selection reception processing, which is displayed in the display apparatus 2. The GUI screen 900 is made of an alternatives display unit 901 and a selectable alternatives display unit 903.

In the alternatives display unit 901, the ordinal ranks of the selected contents are arranged in positions corresponding to the eight press sensors 314 of the operation member 31.

For example, the ordinal rank 1 is displayed in a position corresponding to the position of the press sensor 314*a* from which the key code 001 is transmitted.

When a user presses a press portion on the operation knob 311, which corresponds to an upper right direction, the press portion is pressed down, thereby pressing the press sensor 314*b*. Accordingly, a remote control code including the key code 002 is transmitted from the remote controller 3.

The STB 1, receiving this remote control code, recognizes that the ordinal rank 13 corresponded to the key code 002 in the table 800 has been selected.

The STB 1, receiving the ordinal-rank selection, highlights the portion of the screen corresponding to the selected ordinal rank, for example by displaying the portion 902 in reverse video as in FIG. 9. The STB 1 also displays on the selectable-alternatives display unit 903 a list of eight alternatives whose ordinal ranks are consecutive. In addition, approximate positions of the displayed alternatives are displayed in a bold line in the alternatives display unit 901.

The alternatives displayed as a list on the selectable-alternatives display unit 903 are specifically: an alternative 904*e*, which represents the content 13 managed by being associated with the selected ordinal rank 13; and alternative 904*a*, 904*b*, 904*c*, 904*d*, 904*f*, 904*g*, and 904*h* representing consecutive contents to the selected content 13 in terms of ordinal ranks. Here, the fourth rank alternative 904*e* from the bottom is in tentative selected state. So as to show the tentative selection state, the alternative 904*e* is displayed in reverse video.

Here, when a user rotates the operation knob 311, the STB 1 displays a new set of alternatives according to the direction and amount of the rotation, the new set of alternatives being slid prior to or subsequent to the currently displayed set of alternatives (so-called scroll display processing). Then, the fourth alternative from the bottom is displayed in reverse video, to show the tentative selection state.

Under this state, when the user presses the member 310 (key name: decision button ("OK" in the drawings)), the STB 1 recognizes that the alternative in the tentative selection state is selected, and ends the selection reception processing.

FIG. 10 is a diagram showing one example of a table in which rotation operations are associated with moving amounts of the alternatives displayed on the screen. In this drawing, the rotation operation column is unnecessary in a practical sense, however is shown to facilitate understanding.

For example, "1 right rotation" indicates that the brush 312 is slid to the first rotation sensor to the right. "2 right rotation" indicates that the brush 312 is slid to the second rotation sensor to the right during a predetermined time period.

The remote controller 3 defines a key code to be transmitted according to the direction and amount of rotation and using the code conversion table 304, and transmits a remote control code including the defined key code to the STB 1. The STB 1 receives the remote control code, and decides a position of the new set of alternatives on the screen relative to the currently displayed set of alternatives, and performs a display of the new set of alternatives. Then, the STB 1 displays the fourth alternative from the bottom of the new set of alternatives, in a tentative selection state (i.e. in reverse video).

According to the selection reception processing in this concrete operation example (1), a user approximates the alternative corresponding to a desired content, with a single press operation directed to any of the eight press portions on the operation knob 311 intending to select any one of the ordinal ranks corresponding to contents displayed as a list on the alternatives display unit 901. According to this structure, the number of operation is remarkably reduced compared to the conventional selection reception processing.

<3.2 Concrete Operation Example (2)>

According to the selection reception processing in the concrete operation example (1) described above, a single press operation directed to any of the eight press portions enables selection of an ordinal rank of content. Then, a rotation operation directed to the operation knob 311 enables scroll display of the alternatives with the selected ordinal rank of content as a reference. However, it is also possible to receive selection of an ordinal rank of content by means of a single rotation operation directed to the operation knob 311, and to enable scroll display for the alternatives with the selected ordinal rank of content being a reference, by means of a press operation directed to press portions representing upper/lower directions for the operation knob 311.

Figure 11:
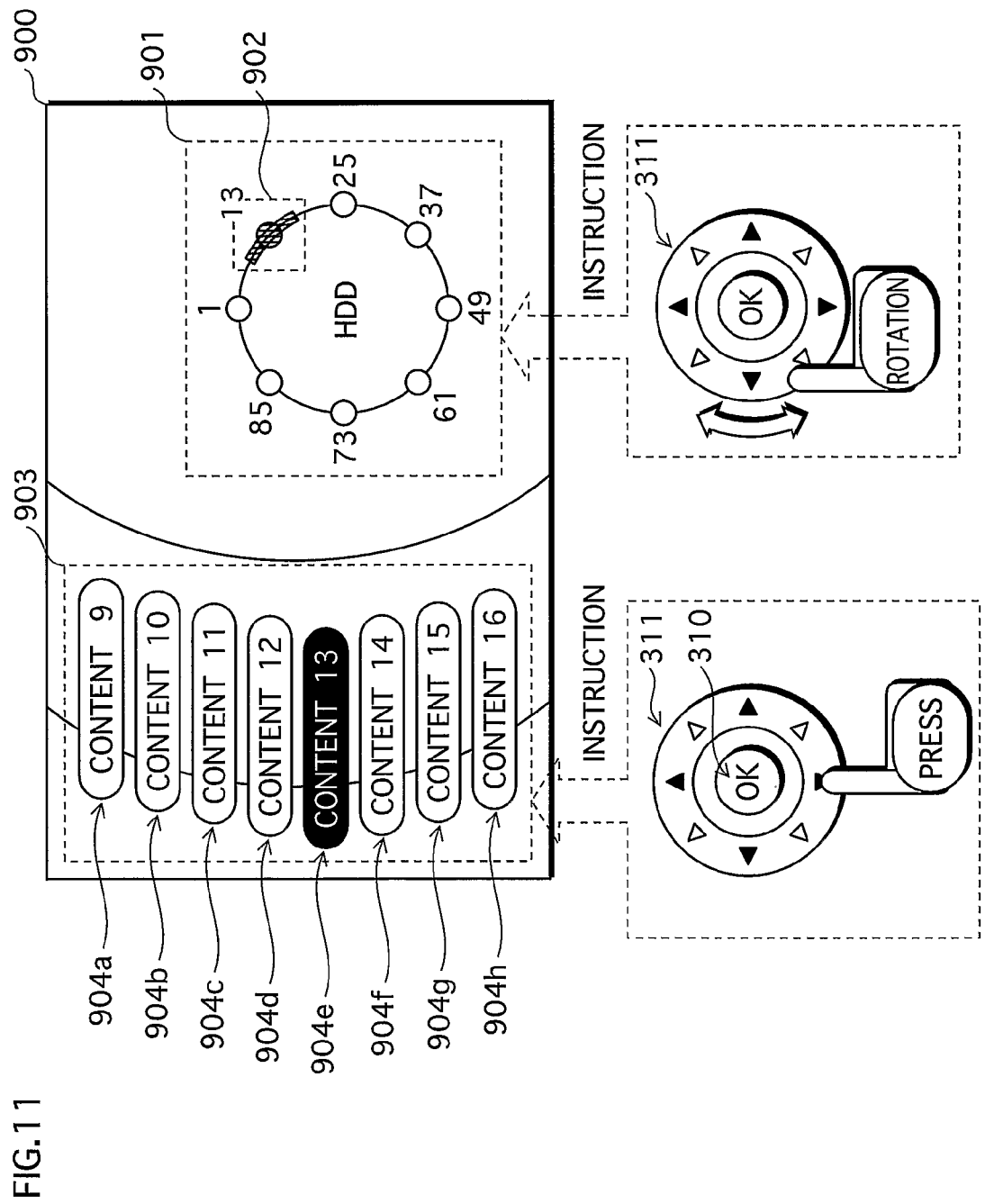
FIG. 11 is a diagram for describing selection reception processing in a concrete operation example (2).

FIG. 11 is a diagram for describing selection reception processing in a concrete operation example (2).

As shown in this drawing, the GUI screen 900 is the same as illustrated in FIG. 9. However, the concrete operation example (2) is different from the concrete operation example (1) in that an ordinal rank of content is selected by a single rotation operation directed to the operation knob 311, and that scroll display of alternatives is performed according to a press operation directed to the press portions representing upper/lower directions for the operation knob 311.

FIG. 12 is a diagram showing one example of a table in which ordinal ranks of eight contents selected from the table 700 of FIG. 7 are associated with respective rotation operations.

In this drawing, the rotation operation column is unnecessary in a practical sense, however is shown to facilitate understanding.

For example, when the STB 1 receives a key code 009 indicating the 1 right rotation is transmitted from the remote controller 3, the STB 1 recognizes that the content's ordinal rank 13, associated with the key code 119 in the table 1200, is selected.

Figure 13:
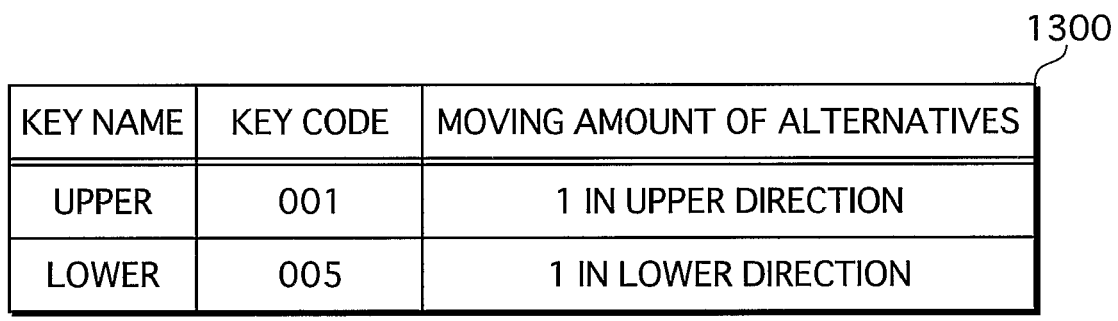
FIG. 13 is a diagram showing one example of a table in which the press operations are associated with a moving amount of alternatives displayed on a screen.

FIG. 13 is a diagram showing one example of the table in which the press operations are associated with a moving amount of the alternatives displayed on the screen. In this drawing, the key name column is unnecessary in a practical sense, but is shown to facilitate understanding.

When a user presses the press portion on the operation knob 311 that indicates upper direction, the press portion is pressed down to press the press sensor 314a. As a result, the remote controller 3 transmits a remote control code including the key code 001.

The STB 1, receiving the remote control code, selects a new set of alternatives that is in the upper direction by one alternative than the currently displayed alternatives, and displays in reverse video the fourth alternative from the bottom of the new set of alternatives, to show that the fourth alternative is in a tentative selection state.

According to the concrete operation example (2) in the above, a user can approximate the alternative corresponding to a desired content, with a single rotation operation for selecting any of the ordinal ranks corresponding to contents displayed as a list on the alternatives display unit 901. According to this structure, the number of operation is remarkably reduced compared to the conventional selection processing.

4. Modification Example 1

The above-described remote controller 3 is equipped with the operation member 31 that can be both pressed and rotated. However, the present invention is not limited to such, and it is also possible to use a remote controller 3A equipped with an operation member disclosed in the Japanese laid-open patent application No. 2002-117751.

FIG. 14 is a diagram showing an external view of the remote controller 3A.

The remote controller 3A has operation members 31A, 32, and 33.

The operation members 32 and 33 are the same as the operation members 32 and 33 shown in FIG. 2.

The operation member 31A is disclosed in the above-mentioned prior art. The following briefly explains its structure, by referring to FIGS. 15A and 15B. Please refer to the actual publication document for more details.

<4.1 Structure of Operation Member 31A>

Figure 15A:
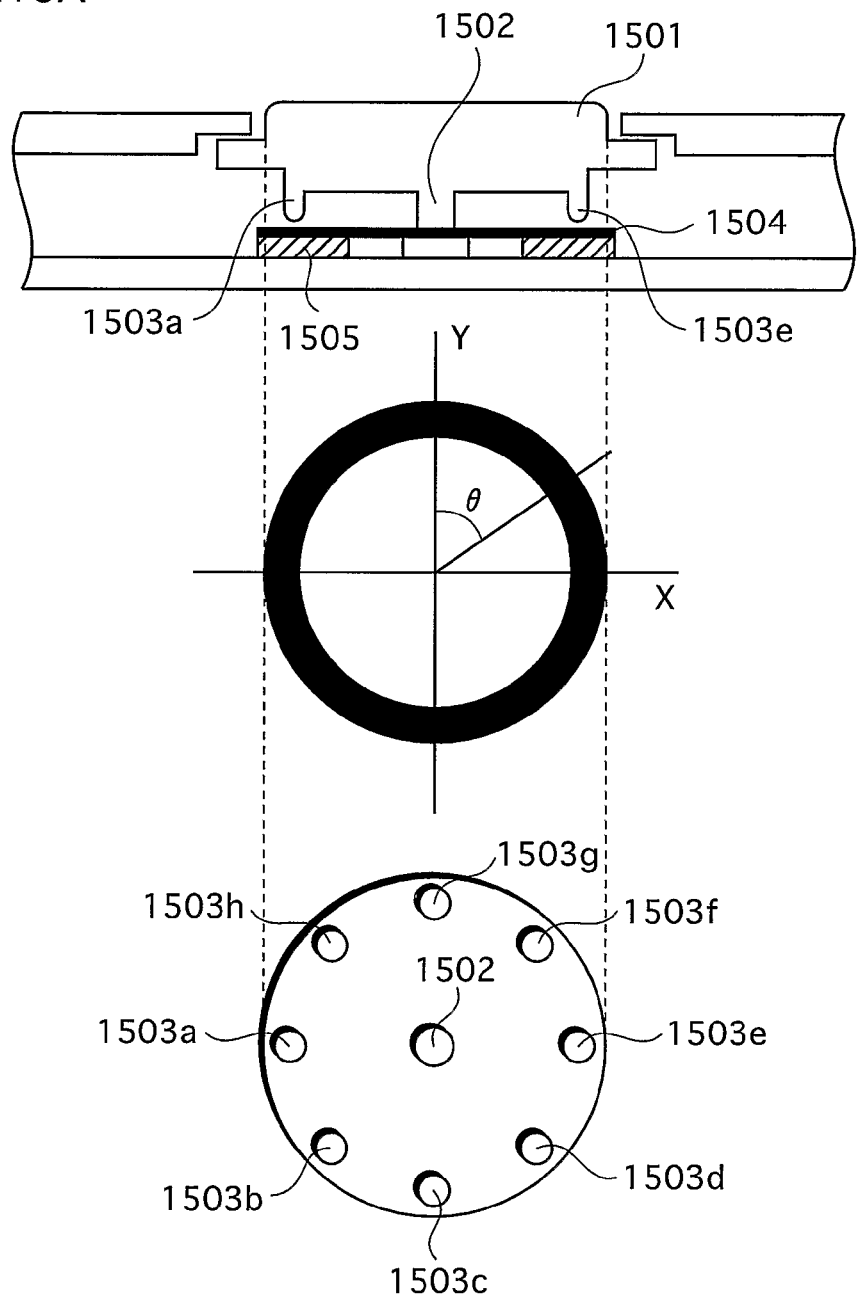
FIG. 15A shows: a sectional view of an operation member 31A cut at an axis B-B' vertically with respect to the plane; a plan view of a resistance element layer 1504 viewed from above; and a backside view of a disk member 1501.

FIG. 15A shows: a sectional view of an operation member 31A cut at the axis B-B' vertically with respect to the plane; a plan view of a resistance element layer 1504 viewed from above; and a backside view of a disk member 1501.

The operation member 31A is composed of the disk member 1501, the resistance element layer 1504, and a conductive layer 1505.

An axis member 1502 is provided at the center of the backside of the disk member 1501. Protrusions 1503a, 1503b, 1503c, 1503d, 1503e, 1503f, 1503g, and 1503h are provided radially with the axis 1502 being a center.

In addition, the disk member 1501 is disposed to stand upright at a lower case of the remote controller with the axis member 1502 as a pivot foot.

Figure 15B:
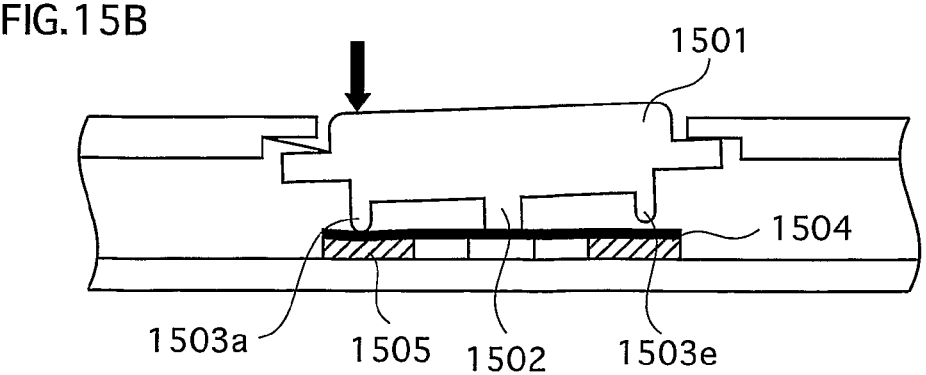
FIG. 15B is a diagram showing a sectional view of the operation member 31A in a case where a user has touched the operation member 31A.

FIG. 15B is a diagram showing a sectional view of the operation member 31A in a case where a user has touched the operation member 31A.

As this diagram shows, when a user places his finger or the like on the surface of the disk member 1501, at position corresponding to the protrusion 1503a at the backside, the disk member 1501 is tilted with the axis unit 1502 being an axis according to application of pressure. As a result, the protrusion 1503a will press the resistance element layer 1504.

When the resistance element layer 1504 is pressed down, an output voltage is caused between the resistance element layer 1504 and the conductive layer 105. This output voltage is a partial pressure reduced according to the resistance value for the pressed position, and is operable to determine the position that the user has touched. Here, the touched position is information represented by angle. In FIG. 15A, this angle information is the angle θ with respect to the positive axis Y.

When a top surface of the disk member 1501 undergoes a sliding operation of a user's finger or the like (hereinafter simply expressed as "a sliding operation directed to the disk member (or directed to an operation member)"), a couple of the protrusions will serially press the resistance element layer 1504, to serially change the pressed positions. Accordingly, the output voltage occurring between the resistance element layer 1504 and the conductive layer 1505.

By detecting the change in this output voltage, it is possible to determine a sliding angle of a sliding operation of a user directed to the operation member 31A.

<4.2 Functional Structure of Remote Controller 3A>

The following describes a functional structure of the remote controller 3A.

Figure 16:
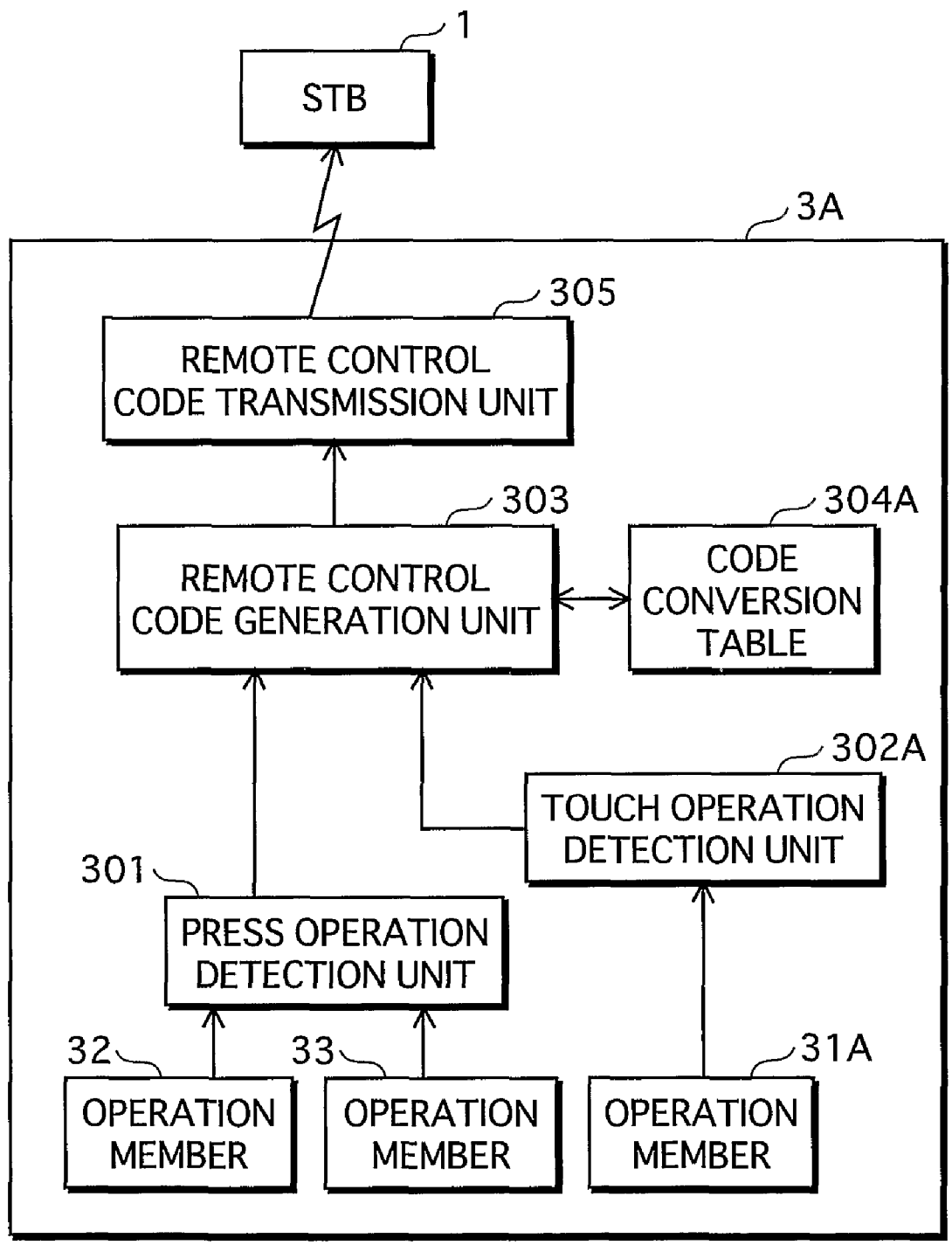
FIG. 16 is a block diagram showing a functional structure of a remote controller 3A.

FIG. 16 is a block diagram showing a functional structure of the remote controller 3A.

The remote controller 3A is functionally equipped with the above-described operation members 31A, 32, 33, a press operation detection unit 301, a touch operation detection unit 302A, a remote control code generation unit 303, a code conversion table 304A, and a remote control code transmission unit 305.

Here, other components than the operation member 31A, the touch operation detection unit 302A, and the code conversion table 304A are the same as the corresponding functional components in the remote controller 3 described above.

The touch operation detection unit 302A detects a voltage value of an electric current that runs in response to a touch operation or a sliding operation directed to the operation member 31A. The detected value of the voltage is sent to the remote control code generation unit 303.

The code conversion table 304A is a table in which values of voltages are associated with remote control codes.

<4.3 Concrete Operation Example (3)>

The following describes a concrete example of selection reception processing of the flowchart of FIG. 6, in the case where the remote controller 3A is used.

Figure 17:
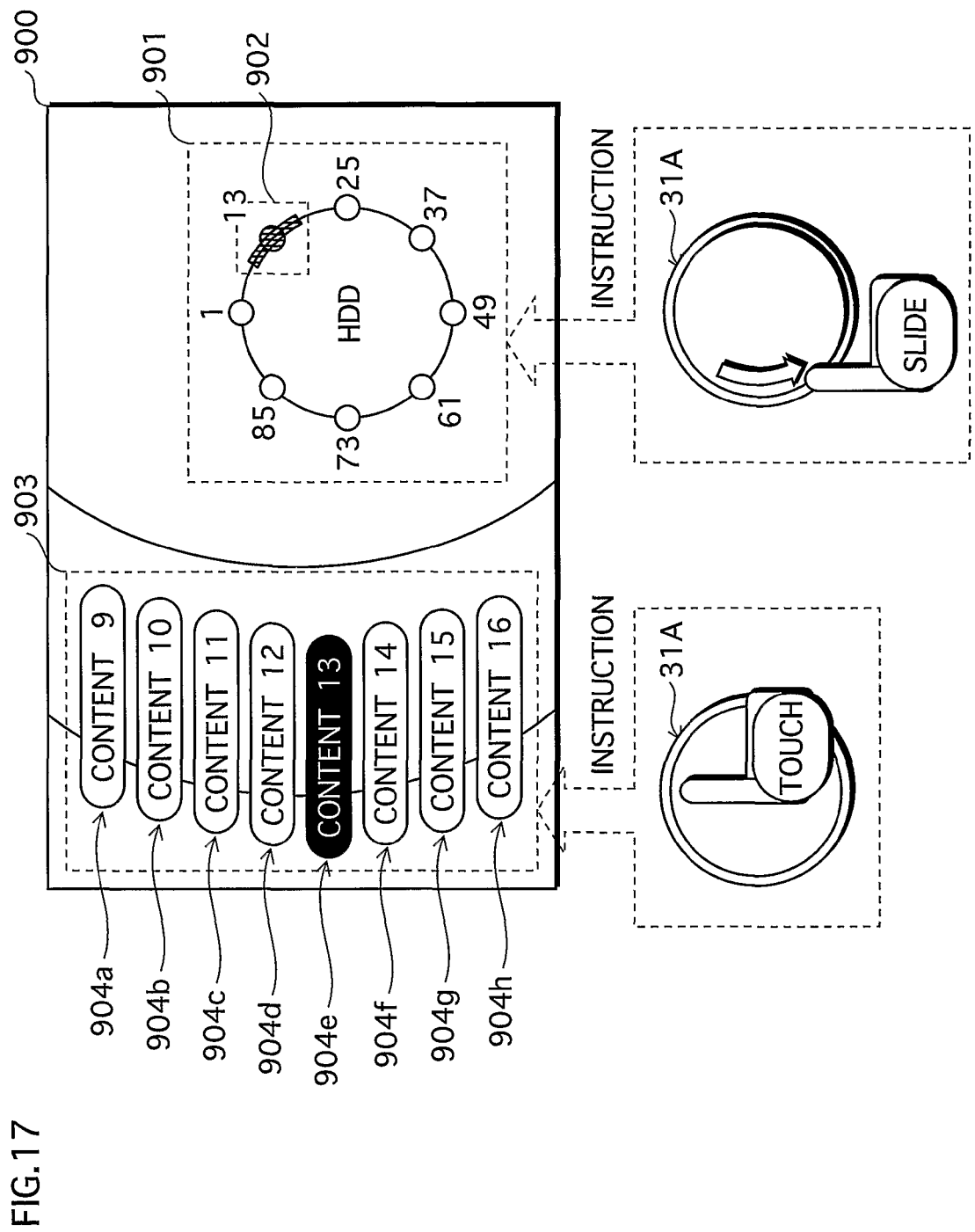
FIG. 17 is a diagram for describing selection reception processing in a concrete example (3).

FIG. 17 is a diagram for describing the selection reception processing in the concrete example (3).

The GUI screen 900 is a GUI screen that the STB 1 displays in the display apparatus 2 for receiving selection of alternatives. The GUI screen 900 in this example is the same as the GUI screen 900 of the concrete operation examples (1) and (2).

Selection of contents' ordinal ranks is performed by a single touch operation directed to the operation member 31A. Selection of a desired alternative is performed by a sliding operation directed to the circumference of the operation member 31A.

Figure 18:
FIG. 18 shows one example of a table in which touch operations are associated with ordinal ranks of eight contents set as selectable alternatives based on the table shown in FIG. 7.

FIG. 18 shows one example of a table created in Step S3 of FIG. 6 described above, in which touch operations are associated with ordinal ranks of eight contents set as selectable alternatives based on the table 700 shown in FIG. 7.

In this drawing, the touch position column is unnecessary in a practical sense, but is shown to facilitate understanding.

For example, when the STB 1 receives a key code 001A indicating the touch position 00 transmitted from the remote controller 3A, the STB 1 recognizes that the content's ordinal rank 1, associated with the key code 001A in the table 1800, is selected.

FIG. 19 is one example of a table in which sliding operations are associated with moving amounts of the alternatives displayed on the screen. In this drawing, the sliding operation column is unnecessary in a practical sense, but is shown to facilitate understanding.

For example, when a user has performed a sliding operation on the surface of the operation member 31A for the angle of +45°, the remote controller 3 transmits a remote control code including the key code 009A.

The STB 1, receiving the remote control code, selects a new set of alternatives that is in the lower direction by one alternative than the currently displayed alternatives (this operation being associated with the key code 009A in the table 1900), and displays in reverse video the fourth alternative from the bottom of the new set of alternatives, to show that the fourth alternative is in a tentative selection state.

According to the selection reception processing in the concrete operation example (3), a user can approximate the alternative corresponding to a desired content, with a single touch operation for selecting any of the ordinal ranks corresponding to contents displayed as a list on the alternatives display unit 901. According to this structure, the number of operation is remarkably reduced compared to the conventional selection processing.

<4.4 Concrete Operation Example (4)>

According to the selection reception processing in the concrete operation example (3), a single touch operation directed to the operation member 31A enables selection of an ordinal rank of content. Then, a sliding operation directed to the operation member 31A enables scroll display of the alternatives with the selected ordinal rank of content as a reference. However, it is also possible to receive selection of an ordinal rank of content by means of a sliding operation, and to enable scroll display for the alternatives with the selected ordinal rank of content being a reference, by means of a touch operation directed to upper/lower sides of the surface of the operation member 31A (upper side corresponding to 0°, and lower side corresponding to 180°).

Figure 20:
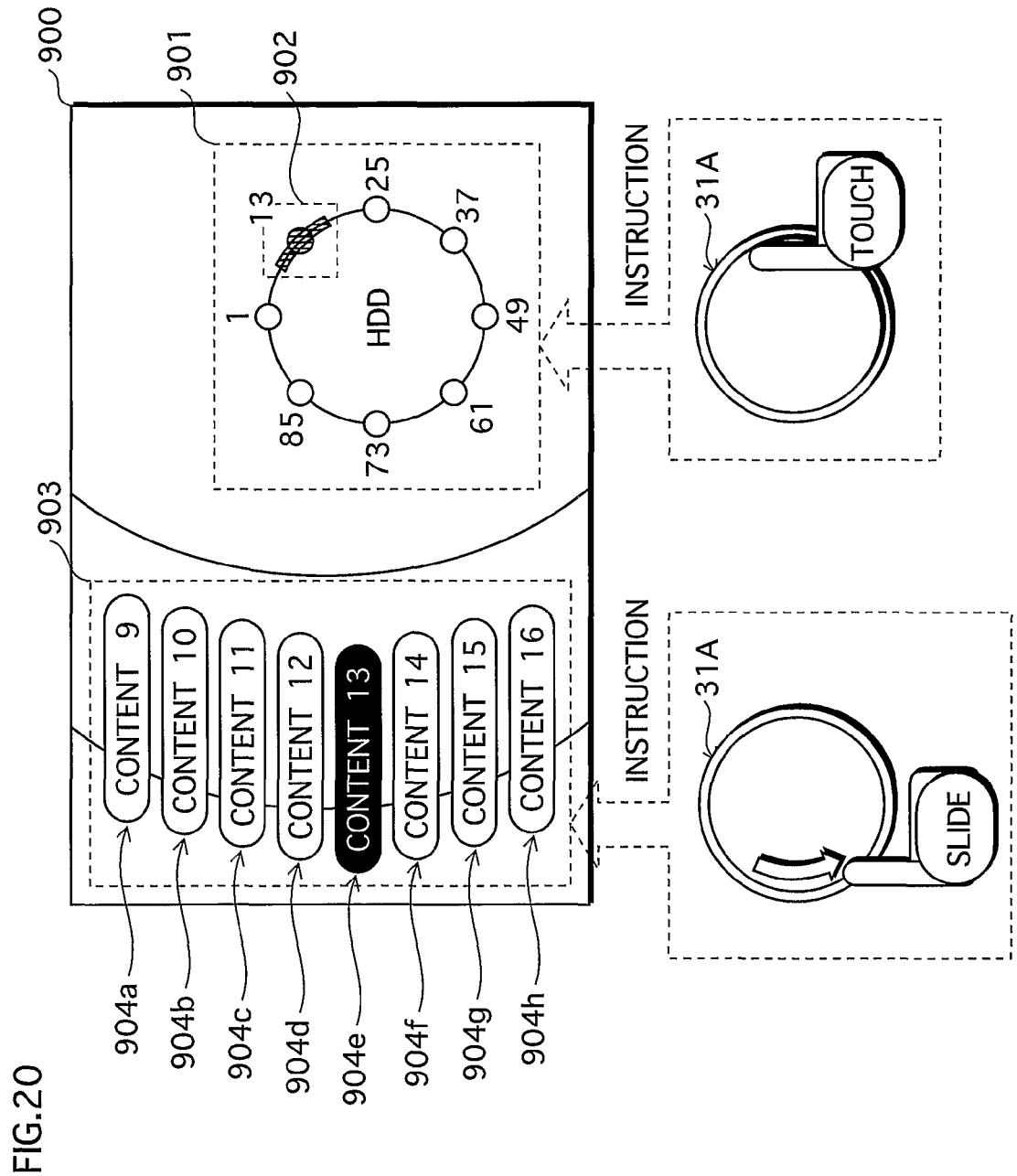
FIG. 20 is a diagram for describing selection reception processing in a concrete operation example (4).

FIG. 20 is a diagram for describing the selection reception processing in the concrete operation example (4).

As this diagram shows, the GUI screen 900 is the same as the GUI screen 900 of the concrete operation examples (1), (2), and (3).

Selection of contents' ordinal ranks is performed by a single sliding operation directed to the operation member 31A. Selection of a desired alternative is performed by an operation to touch either the upper side of the operation member 31A (0°) or the lower side (180°) thereof.

FIG. 21 shows one example of a table created in Step S3 of FIG. 6 described above, in which sliding operations are associated with ordinal ranks of eight contents set as selectable alternatives based on the table 700 shown in FIG. 7.

In this drawing, the sliding operation column is unnecessary in a practical sense, but is shown to facilitate understanding.

For example, when the STB 1 receives a key code 001A indicating the sliding operation corresponding to +90° transmitted from the remote controller 3A, the STB 1 recognizes that the content's ordinal rank 25, associated with the key code 010A in the table 2100, is selected.

Figure 22:
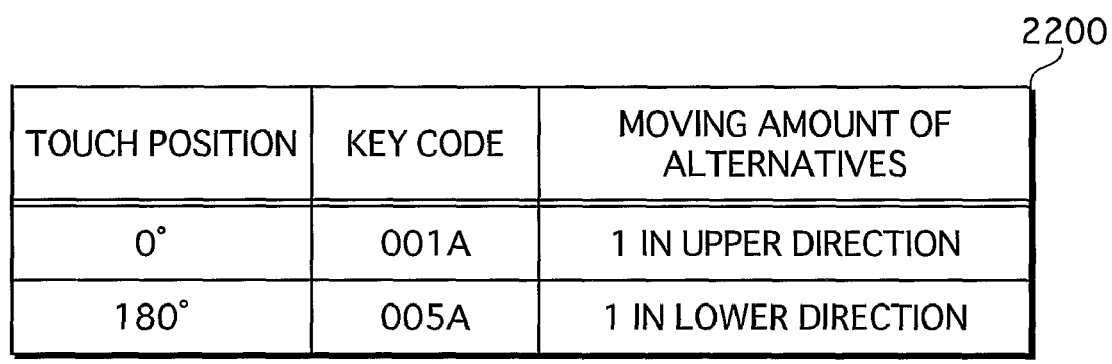
FIG. 22 is one example of a table in which touch operations are associated with moving amounts of alternatives displayed on a screen.

FIG. 22 is one example of a table in which touch operations are associated with moving amounts of the alternatives displayed on the screen. In this drawing, the touch position column is unnecessary in a practical sense, but is shown to facilitate understanding.

When a user has touched on the upper side of the operation member 31A, the remote controller 3A transmits a remote control code including the key code 001A.

The STB 1, receiving the remote control code, selects a new set of alternatives that is in the upper direction by one alternative than the currently displayed alternatives (this operation being associated with the key code 001A in the table 2200), and displays in reverse video the fourth alternative from the bottom of the new set of alternatives, to show that the fourth alternative is in a tentative selection state.

According to the selection reception processing in the concrete operation example (4), a user can approximate the alternative corresponding to a desired content, with a single sliding operation for selecting any of the ordinal ranks corresponding to contents displayed as a list on the alternatives display unit 901. According to this structure, the number of operation is remarkably reduced compared to the conventional selection processing.

5. Modification Example of GUI Screen

The GUI screen that the STB 1 displays on the display apparatus 2 in the above-described selection reception processing is not limited to the GUI screen 900 illustrated in FIGS. 9, 11, 17, and 20. For example, the following GUI screens may be alternatively used.

<5.1 GUI Screen (1)>

Figure 23:
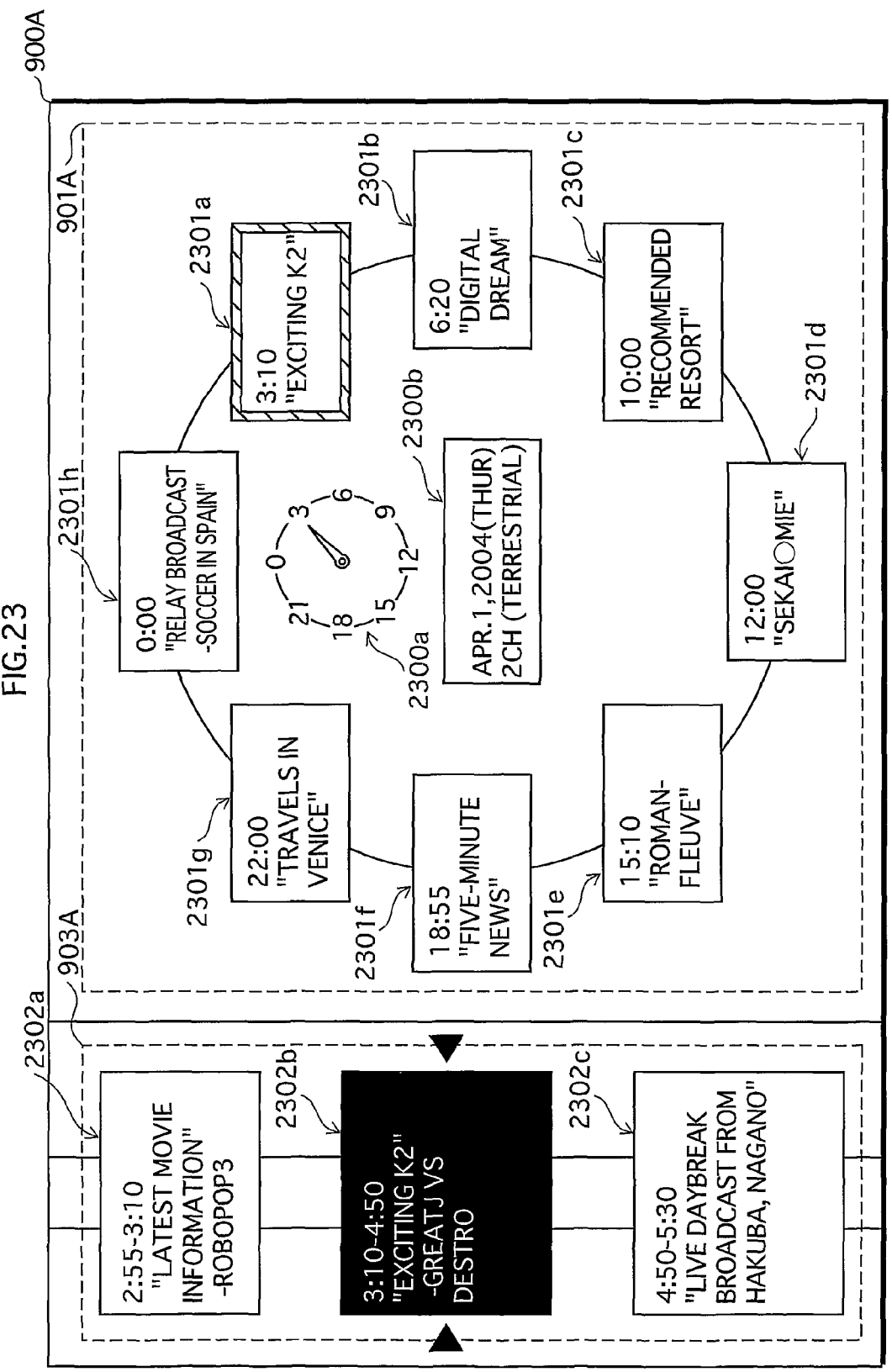
FIG. 23 shows one example of a GUI screen for receiving an instruction of record presetting of a scheduled TV program.

FIG. 23 shows one example of a GUI screen for receiving an instruction of record presetting of a scheduled TV program.

The GUI screen 900A is composed of an alternatives display unit 901A and a selectable-alternatives display unit 903A.

On the alternatives display unit 901A, sets of broadcast start time and title are displayed, the sets respectively corresponding to scheduled programs associated with ordinal ranks of contents selected in Step S2 in the aforementioned selection reception processing as alternatives. The sets of broadcast start time and title (respectively called alternatives 2301*a*, 2301*b*, 2301*c*, 2301*d*, 2301*e*, 2301*f*, 2301*g*, and 2301*h*) are disposed on the alternatives display unit 901A in a circular formation.

At the center of the circular formation of the alternatives, a timer unit 2300*a* in 24-hour display, and a window 2300*b* presenting a broadcast day and a channel of the scheduled programs that are the targets of the record presetting are displayed.

The timer unit 2300*a* is set to indicate an approximate broadcast start time of the scheduled program indicated by the selected alternative.

When one of the alternatives shown in the alternatives display unit 901A is selected, the STB 1 highlights the frame of the selected alternative (e.g. alternative 2301*a* in the drawing), and the timer unit 2300*a* is set to indicate the approximate broadcast start time of the scheduled program indicated by the selected alternative, by means of its needle.

The STB1 also displays, on the selectable-alternatives display unit 903A, a list of an alternative 2302*b*, an alternative 2302*a*, and an alternative 2302*c*, where the alternatives, 2302*a* and 2302*c* are managed consecutive in ordinal ranks to the alternative 2302*b* corresponding to the scheduled program indicated by the selected alternative.

<5.2 GUI Screen (2)>

Figure 24:
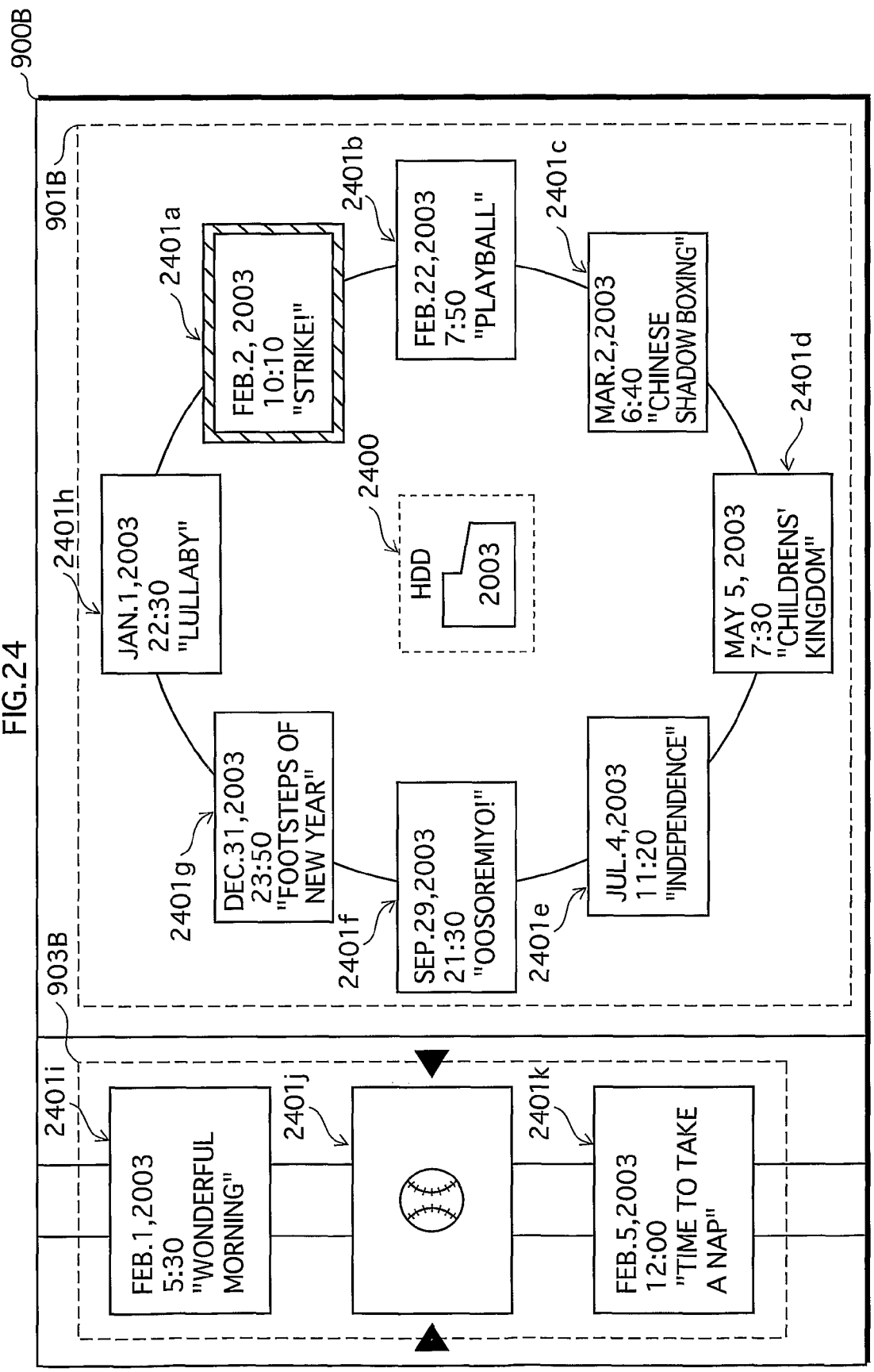
FIG. 24 shows one example of a GUI screen for receiving a selection of a content to be played back.

FIG. 24 shows one example of a GUI screen for receiving a user selection of a content to be played back, from among contents recorded in the HDD 23.

The GUI screen 900B is composed of an alternatives display unit 901B and a selectable-alternatives display unit 903B.

On the alternatives display unit 901B, sets of recorded date/time and title are displayed, the sets respectively corresponding to ordinal ranks of contents selected in Step S2 in the aforementioned selection reception processing as alternatives. The sets of recorded date/time and title (respectively called alternatives 2401a, 2401b, 2401c, 2401d, 2401e, 2401f, 2401g, and 2401h) are disposed on the alternatives display unit 901B in a circular formation.

At the center of the circular formation of the alternatives, a folder icon 2400 indicating a recorded place is displayed.

When one of the alternatives shown in the alternatives display unit 901B is selected, the STB 1 highlights the frame of the selected alternative (e.g. alternative 2401a in the drawing).

The STB 1 also displays, on the selectable-alternatives display unit 903B, a list of an alternative 2401j, an alternative 2401i, and an alternative 2401k, where the alternatives 2401i and 2401k are managed consecutive in ordinal ranks to the alternative 2401j corresponding to the content indicated by the selected alternative. Here, as for the alternative 2401j, which is in a tentative selection state, a thumbnail is displayed instead of text information indicating recorded date/time and name.

<5.3 GUI Screen (3)>

Figure 25:
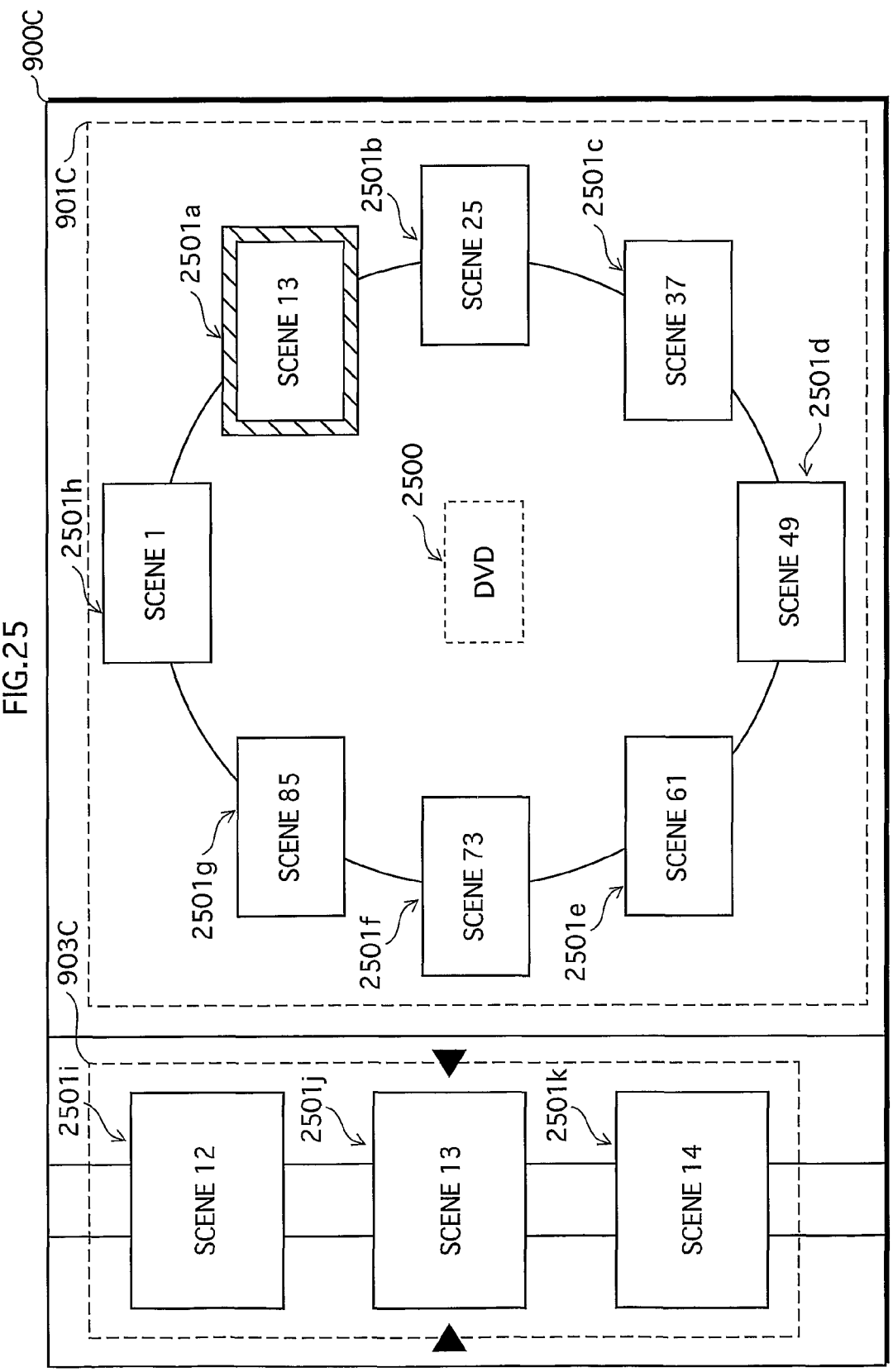
FIG. 25 shows one example of a GUI screen for receiving a selection of a content to be played back.

FIG. 25 shows one example of a GUI screen for receiving a user selection of a scene to be played back, from among scenes of a content recorded in the DVD 7.

The GUI screen 900C is composed of an alternatives display unit 901C and a selectable-alternatives display unit 903C.

On the alternatives display unit 901C, sets of thumbnails are displayed, the sets respectively corresponding to ordinal ranks of scenes selected in Step S2 in the aforementioned selection reception processing as alternatives. The sets of thumbnails (respectively called alternatives 2501a, 2501b, 2501c, 2501d, 2501e, 2501f, 2501g, and 2501h) are disposed on the alternatives display unit 901C in a circular formation. At the center of the circular formation of the alternatives, information 2500 indicating a medium on which the alternatives' are recorded is displayed.

When one of the alternatives shown in the alternatives display unit 901C is selected, the STB 1 highlights the frame of the selected alternative (e.g. alternative 2501a in the drawing).

The STB 1 also displays, on the selectable-alternatives display unit 903B, a list of an alternative 2501j, an alternative 2501i, and an alternative 2502k, where the alternative 2501i and 2501k are managed consecutive in ordinal ranks to alternative 2501j corresponding to the content indicated by the selected alternative.

<5.4 GUI Screen (4)>

FIG. 26 shows one example of a GUI screen for receiving a user selection of a content to be played back, from among contents recorded in the HDD 23.

On a GUI screen 900D, an ordinal-rank barometer 2601, a selection-position indicating icon 2602, a genre 2603, a recorded title number 2604, and a selection-position contents display column 2605 are displayed.

The ordinal-rank barometer 2601 displays ordinal ranks of alternatives in barometer display.

The selection-position indicating icon 2602 is an arrow icon for indicating an ordinal-rank on the ordinal rank barometer 2601. By the sliding operation directed to the operation member 31 either in right or left direction, the position indicated by the selection-position indicating icon 2602 skips either to right or left in 10 ordinal ranks. By the press of the left/right button of the operation member 31, the ordinal rank is skipped one by one either in right or left.

The selected contents all belong to "sports" as indicated by the genre 2603.

The number of contents belonging to the genre "sports" is 82, as shown in the recorded title number 2604. However the ordinal-rank barometer 2601 has 120 scales incrementing by 10 from 0.

On the selection-position display column 2605, thumbnails of titles corresponding to ordinal ranks in the vicinity of the position that indicates the selection-position indicating icon 2602.

According to this construction, a user can first selects an approximate position on the ordinal-rank barometer 2601, and then select a desired title by looking at the selection-position display column 2605.

6. Notes

Needless to say, the present invention is not limited to the embodiments described above, and includes examples as shown below.

(1) In the selection reception processing described above, ordinal ranks, recorded date/time, name, or thumbnails are displayed in a GUI screen as a list. However, it is not necessary to display all of these kinds of information as a list. It is allowable if a list display for the alternatives is not performed, or if only a list display including part of the alternatives is performed. In addition, it is possible to select alternatives of already determined ordinal ranks. For example, out of 80 contents available, it is possible to select contents having ordinal ranks of 1, 25, 51, and 75.

(2) In the examples of the above-described GUI screen, the alternatives display unit and the selectable-alternatives display unit are displayed on a screen synchronously. However, the present invention includes a GUI screen in which these display units are not displayed synchronously. For example, The GUI may have a structure in which the alternatives display unit is displayed first, and when an alternative selection is performed, the selectable-alternatives display unit is displayed instead. The above GUI may additionally have a structure in which when the alternatives displayed in the selectable-alternatives display unit on the display is scrolled in an amount determined in advance, the alternatives display unit is displayed again stopping the display of the selectable-alternatives display unit.

(3) Examples of attributes relating to the alternatives are shown below. Examples of each scene within a content are opening, scene 1, and ending. Examples of each function of an AV apparatus are provision of a program list, G-code inputting, and programming of record presetting. Examples of a broadcast format are a terrestrial analogue format, a terrestrial digital format, BS, and CS. Examples of recording media are an HDD, a DVD, and an SD. Examples of genres of contents are sports, news, science, and economics. Examples of instructions from a user are playback, recording, and deletion. Examples of spots photographed using a video camera or the like are Hokkaido, Tokyo, and Osaka. Examples of types of contents are an image, a photograph, music, and a game.

(4) The STB 1 may be structured to select alternatives based on a selection rule received from a user. Examples of such selection rules are a rule that prescribes to select contents whose ordinal ranks' lowest order is 0 (e.g. 10, 20, 30 . . . ), and a rule that prescribes to select contents according to their playback durations (e.g. less than one hour, more than one hour, . . . ). Other examples are a rule that prescribes to select one content from each group of contents classified under initials of the titles, and a rule that prescribes to select one content from those belonging to a broadcast channel.

(5) In the above-described selection reception processing, eight alternatives are displayed after reception of an instruction to display contents selection reception screen. When there is increase or decrease in number of contents recorded in a recording medium such as the HDD 23, it is possible to set a new set of alternatives reflecting the change in ordinal ranks and create a new table.

(6) In the above-described selection reception processing, eight ordinal ranks of contents are set as selectable alternatives. However, the present invention is not limited to such a structure, and may set twelve ordinal ranks of contents, by providing the operation member 31 with twelve press sensors. Alternatively, a structure of setting four ordinal ranks of contents in association with four of eight press sensors, the four press sensors corresponding to "upper", "lower", "left", and "right" directions.

(7) In the above-described remote controller 3, the operation knob 311 of the operation member 31 is in a disk form. However, the form of the operation knob 311 may alternatively be in an oval form, a triangular form, a rectangular form, and a star form. The same thing applies to the form of the operation member 31A of the remote controller 3A.

In addition, the number of rotation sensors and press sensors, in the operation member 31, are not limited to 8, and may be 4, 7, or 12, for example. The same thing applies to the number of protrusions of the operation member 31A, and there may be 12, or 16 protrusions, for example.

(8) The present invention cannot only be carried out as the above-described STB, but also be carried out as a television or a game apparatus, or even as a portable terminal to which an operation unit and a display unit are integrated.

(9) In the above-described embodiments, two different types of operations are used for different purposes. For example, a press operation is used for selection of alternatives, while a rotation operation is used for scroll display control for the alternatives. However, the present invention is not limited to such a structure. For example, a press operation can be used for both of selection of alternatives, and scroll display control of the alternatives. Likewise, a rotation operation or a sliding operation can be used for both of selection of alternatives, and scroll display control of the alternatives. In addition, a display method of alternatives is not limited to scroll display, and may alternatively be performed page by page in a predetermined number.

(10) The STB 1 described above may manage contents in the order of number of playback, in the order of the Japanese syllabary, or in the order of any kinds of alphabet. In addition, alternatives may be program channels, or menu items assigned ordinal ranks.

(11) The present invention may also be a selection reception method including each procedure of the described selection reception processing (e.g. procedure shown in FIG. 6). Or the present invention may be a program to make an apparatus equipped with a CPU perform the described selection reception processing.

(12) The present invention may also be the above-described program recorded in a computer-readable recording medium, where examples of the computer-readable recording medium are a flexible disk, a hard disk, a CD, an MO, a DVD, a BD (Blu-ray Disc), and a semiconductor memory.

INDUSTRIAL APPLICABILITY

The present invention is applicable to an electronic apparatus (e.g. an AV apparatus and a portable terminal) equipped with a user interface used for receiving an alternatives selection.

The invention claimed is:

1. A user interface apparatus comprising:
an operation member on which three different types of operations are possible;
a managing unit operable to manage n alternatives by assigning thereto respective ordinal ranks;
a setting unit operable to set, as selectable, m alternatives from among the n alternatives, without categorizing the n alternatives, where n and m are integers satisfying n>m>2;
a table storage unit operable to store therein (i) a first table that includes operations each defined as a first type operation received by the operation member that one-to-one correspond to the set m alternatives displayed in a circular pattern and (ii) a second table that includes operations each defined as a second type operation received by the operation member that one-to-one correspond to change directions and change amounts with respect to an ordinal rank of one alternative currently being selected:
a creation unit operable to create the first table based on m alternatives set by the setting unit,
a first receiving unit operable to, each time the first type operation is received by the operation member until a third type operation is received by the operation member, receive selection of one of the m alternatives that corresponds to an operation defined as the received first type operation with reference to the first table;
a second receiving unit operable to, each time the second type operation is received by the operation member until the third type operation is received by the operation member, receive, instead of one alternative currently being selected, selection of one alternative that is previous or subsequent to the currently selected alternative by at least one alternative, in accordance with a change direction and a change amount with respect to an ordinal rank of the currently selected alternative that corresponds to an operation defined as the received second type operation with reference to the second table;
a third receiving unit operable to determine, according to the third type operation, one alternative currently being selected based on immediately previously received one of the first type operation and the second type operation; and
a display control unit operable to, each time the first type operation or the second type operation is received until the third type operation is received, display, in a display apparatus, a set of alternatives in a predetermined number including one alternative currently being selected, the set of alternatives being consecutive in terms of ordinal ranks.

2. The user interface apparatus of claim 1, wherein
the operation member has a circular shape, and is operable to detect a sliding operation and a press operation performed by a user,
the first type operation is a sliding operation directed to a vicinity of circumference of the operation member, the operations each defined as the first type operation each indicate a sliding angle of the sliding operation, the second type operation is a press operation directed to a vicinity of circumference of the operation member, the operations each defined as the second type operation each indicate a press direction determined in a position of the operation member where the press operation is performed, and the third type operation is a press operation directed to a central part of the operation member.

3. The user interface apparatus of claim 2, wherein when an instruction to display an alternative selection screen is received from the user, the creation unit causes the setup unit to set m alternatives, and creates the first table.

4. The user interface apparatus of claim 2, wherein when the n alternatives changes in number, the creation unit causes the setup unit to set m alternatives, and creates the first table.

5. The user interface apparatus of claim 2, wherein when the managing unit changes the n alternatives in ordinal ranks, the creation unit causes the setup unit to set m alternatives, and creates the first table.

6. The user interface apparatus of claim 2, wherein the alternatives are each a content recorded in a storage unit, the managing unit manages the n contents in descending order of dates recorded into the storage unit, and the display control unit displays, in the display apparatus, a user interface screen on which recorded dates of m contents are disposed in a circular pattern.

7. The user interface apparatus of claim 2, wherein the alternatives are each a content recorded in a storage unit, the managing unit manages the n contents in descending order of number of times played back, and the display control unit displays, in the display apparatus, a user interface screen on which number of times played back for m contents are disposed in a circular pattern.

8. The user interface apparatus of claim 2, wherein the alternatives are each a content recorded in a storage unit, the managing unit manages the n contents, in one of an order of the Japanese syllabary and an alphabetical order, and the display control unit displays, in the display apparatus, a user interface screen on which initials of titles of m contents are disposed in a circular pattern.

9. The user interface apparatus of claim 2, wherein the alternatives are each a program channel, the managing unit manages the n program channels in descending order, and the display control unit displays, in the display apparatus, a user interface screen on which m program channels are disposed in a circular pattern.

10. The user interface apparatus of claim 2, wherein the setup unit sets m alternatives from among the n alternatives, such that, with respect to m alternatives displayed in the circular pattern, number of alternatives between two adjacent alternatives is substantially equal to number of alternatives between each of all of other two adjacent alternatives.

11. The user interface apparatus of claim 1, wherein the operation member has a circular shape, and is operable to detect a press operation and a sliding operation performed by a user, the first type operation is a press operation directed to a vicinity of circumference of the operation member, and the operations each defined as the first type operation each indicate a press position of the operation member where the press operation is performed, the second type operation is a sliding operation directed to a vicinity of circumference of the operation member, the operations each defined as the second type operation each indicate a sliding angle of the sliding operation, and the third type operation is a press operation directed to a central part of the operation member.

12. The user interface apparatus of claim 1, wherein the operation member is rotatable and circular, and is operable to detect a rotation operation and a press operation performed by a user, the first type operation is a rotation operation directed to the operation member, the operations each defined as the first type operation each indicate a rotation angle of the rotation operation, the second type operation is a press operation directed to a vicinity of circumference of the operation member, the operations each defined as the second type operation each indicate a press direction determined in a position of the operation member where the press operation is performed, and the third type operation is a press operation directed to a central part of the operation member.

13. The user interface apparatus of claim 1, wherein the operation member is rotatable and circular, and is operable to detect a press operation and a rotation operation performed by a user, the first type operation is a press operation directed to a vicinity circumference of the operation member, the operations each defined as the first type operation each indicate a press position of the operation member where the press operation is performed, the second type operation is a rotation operation directed to the operation member, the operations each defined as the second type operation each indicate a rotation angle of the rotation operation, and the third type operation is a press operation directed to a central part of the operation member.

14. A selective reception method for execution by a computer, that includes an operative member on which three different types of operations can be executed by a user and that manages n alternatives by assigning thereto respective ordinal ranks, the selection receptive steps comprising:

a setting step of setting, as selectable, m alternatives from among the n alternatives, without categorizing the n alternatives, where n and m are integers satisfying n>m>2;

a table storage step of storing in a memory,
(i) a first table that includes operations each defined as a first type operation received by the operation member that one-to-one correspond to the set m alternatives displayed in a circular pattern, and
(ii) a second table that includes operations each defined as a second type operation received by the operation member that one-to-one correspond to change directions and change amounts with respect to an ordinal rank of one alternative currently being selected;

a creation step of creating the first table based on m alternatives set by the setting step;

a first receiving step for receiving a selection of one of the m alternatives that corresponds to an operation defined as the received first type operation with reference to the first table for each time the first type operation is received by the operation member until a third type operation is received by the operation member;

a second receiving step for receiving selection of one alternative that is previous or subsequent to the currently selected alternative by at least one alternative, in accordance with a change direction and a change amount with respect to an ordinal rank of the currently selected alternative that corresponds to an operation defined as the received second type operation with reference to the second table, for each time the second type operation is received by the operation member until the third type operation is received by the operation member, receive, instead of one alternative currently being selected;

a third receiving step for determining, according to the third type of operation, one alternative currently being selected based on an immediately previously received one of the first type operation and the second type operation; and a displaying step for displaying on a display apparatus, each time the first type operation or the second type operation is received until the third type operation is received, a set of alternatives in a predetermined number including one alternative currently being selected, the set of alternatives being consecutive in terms of ordinal ranks.

15. A recording medium having recorded therein a program for making a computer perform selection reception processing, where the computer that includes an operative member on which three different types of operations can be executed by a user and that manages n alternatives by assigning thereto respective ordinal ranks, the selection receptive steps comprising:

a setting step of setting, as selectable, m alternatives from among the n alternatives, without categorizing the n alternatives, where n and m are integers satisfying n>m>2;

a table storage step of storing in a memory,
(i) a first table that includes operations each defined as a first type operation received by the operation member that one-to-one correspond to the set m alternatives displayed in a circular pattern, and
(ii) a second table that includes operations each defined as a second type operation received by the operation member that one-to-one correspond to change directions and change amounts with respect to an ordinal rank of one alternative currently being selected;

a creation step of creating the first table based on m alternatives set by the setting step;

a first receiving step for receiving a selection of one of the m alternatives that corresponds to an operation defined as the received first type operation with reference to the first table for each time the first type operation is received by the operation member until a third type operation is received by the operation member;

a second receiving step for receiving selection of one alternative that is previous or subsequent to the currently selected alternative by at least one alternative, in accordance with a change direction and a change amount with respect to an ordinal rank of the currently selected alternative that corresponds to an operation defined as the received second type operation with reference to the second table, for each time the second type operation is received by the operation member until the third type operation is received by the operation member, receive, instead of one alternative currently being selected;

a third receiving step for determining, according to the third type of operation, one alternative currently being selected based on an immediately previously received one of the first type operation and the second type operation; and a displaying step for displaying on a display apparatus, each time the first type operation or the second type operation is received until the third type operation is received, a set of alternatives in a predetermined number including one alternative currently being selected, the set of alternatives being consecutive in terms of ordinal ranks.

* * * * *